(12) United States Patent
Pasca et al.

(10) Patent No.: US 11,256,978 B2
(45) Date of Patent: Feb. 22, 2022

(54) HYPERBOLIC FUNCTIONS FOR MACHINE LEARNING ACCELERATION

(71) Applicant: Intel Corporation, Santa Clara, CA (US)

(72) Inventors: Bogdan Pasca, Toulouse (FR); Martin Langhammer, Alderbury (GB)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 15/863,544

(22) Filed: Jan. 5, 2018

(65) Prior Publication Data

US 2019/0042924 A1    Feb. 7, 2019

Related U.S. Application Data

(60) Provisional application No. 62/555,510, filed on Sep. 7, 2017, provisional application No. 62/532,874, filed on Jul. 14, 2017.

(51) Int. Cl.
  *G06N 3/063* (2006.01)
  *G06N 3/04* (2006.01)
  *G06F 7/544* (2006.01)
  *G06F 7/548* (2006.01)

(52) U.S. Cl.
  CPC .......... *G06N 3/063* (2013.01); *G06F 7/544* (2013.01); *G06F 7/548* (2013.01); *G06N 3/0481* (2013.01); *G06F 2207/4824* (2013.01)

(58) Field of Classification Search
  CPC ...... G06N 3/063; G06N 3/0481; G06F 7/544; G06F 7/548; G06F 2207/4824

USPC .......................................................... 706/33
  See application file for complete search history.

(56) References Cited

U.S. PATENT DOCUMENTS

| | | | | |
|---|---|---|---|---|
| 5,473,730 A | * | 12/1995 | Simard | G06N 3/063 706/20 |
| 5,898,603 A | | 4/1999 | Osborn | |
| 6,041,322 A | * | 3/2000 | Meng | G06N 3/063 706/43 |
| 2018/0081634 A1 | * | 3/2018 | Mahurin | G06F 7/544 |
| 2018/0189640 A1 | * | 7/2018 | Henry | G06F 9/3001 |

FOREIGN PATENT DOCUMENTS

| | | |
|---|---|---|
| EP | 1033660 A1 | 9/2000 |
| EP | 3035205 A1 | 6/2016 |

OTHER PUBLICATIONS

Communication pursuant to Article 94(3) EPC for EP Application No. 18179419.9 dated Nov. 27, 2020.

(Continued)

*Primary Examiner* — Tsu-Chang Lee
(74) *Attorney, Agent, or Firm* — Fletcher Yoder, P.C.

(57) ABSTRACT

The present disclosure relates generally to techniques for enhancing recurrent neural networks (RNNs) implemented on an integrated circuit. In particular, approximations of activation functions used in an RNN, such as sigmoid and hyperbolic tangent, may be implemented in an integrated circuit, which may result in increased efficiencies, reduced latency, increased accuracy, and reduced resource consumption involved with implementing machine learning.

15 Claims, 12 Drawing Sheets

(56) References Cited

OTHER PUBLICATIONS

Brown, H.K. et al., "A Neural Network Integrated Circuit Supporting Programmable Exponent and Mantissa," Proceedings of the Custom Integrated Circuits Conference, Boston, MA, May 13-16, 1990.
Extended European Search Report for EP Application No. 18179419.9 dated Dec. 12, 2018.

* cited by examiner

US 11,256,978 B2

HYPERBOLIC FUNCTIONS FOR MACHINE LEARNING ACCELERATION

CROSS REFERENCE TO RELATED APPLICATIONS

This application is a Non-Provisional Application claiming priority to U.S. Provisional Patent Applications Nos. 62/532,874, filed Jul. 14, 2017, and 62/555,510, filed Sep. 7, 2017, both titled "Hyperbolic Functions for Machine Learning Acceleration," which are incorporated by reference herein in their entireties for all purposes.

BACKGROUND

The present disclosure relates generally to integrated circuits, such as field programmable gate arrays (FPGAs). More particularly, the present disclosure relates to activation functions for machine learning implemented on an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine learning is becoming an increasingly valuable application area. For example, it may be utilized in natural language processing, computer vision, such as object recognition, bioinformatics, and economics, among other fields and applications. A common class of machine learning techniques are represented by recurrent neural networks (RNNs). While RNNs are increasingly used in real world applications, such as translation, text, and speed processing, their use of recursion and possible incorporation of iterations of large matrix-vector multiplications may create complexity. Consequently, RNNs may suffer from latency and accuracy issues, as well as resource utilization issues, especially as related to their use of activation functions.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for enhancing neural networks that use activation functions, such as recurrent neural networks (RNNs), implemented on an integrated circuit. In particular, in certain embodiments, approximations of activation functions used in an RNN, such as sigmoid and hyperbolic tangent, may be implemented in an integrated circuit, such as an FPGA, which may result in increased efficiencies, reduced latency, increased accuracy, and reduced resource utilization involved with machine learning.

Figure 1:
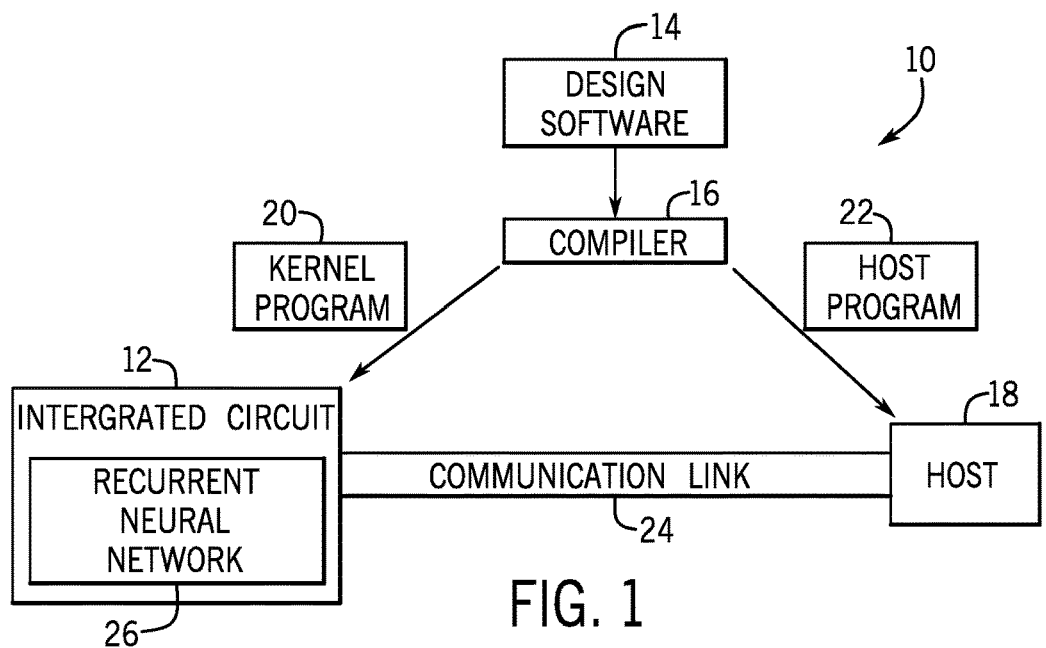
FIG. 1 is a block diagram of a system for implementing neural networks, such as recurrent neural networks (RNNs), in accordance with an embodiment.

With the foregoing in mind, FIG. 1 illustrates a block diagram of a system 10 that may implement machine learning techniques. A designer may desire to implement functionality, such as the hyperbolic functions of this disclosure, on an integrated circuit device 12 (IC, such as a field programmable gate array (FPGA)). The designer may specify a high-level program to be implemented, such as an OpenCL program, which may enable the designer to more efficiently and easily provide programming instructions to configure a set of programmable logic cells for the integrated circuit device 12 without requiring specific knowledge of low level hardware description languages (e.g., Verilog or VHDL). For example, because OpenCL is quite similar to other high level programming languages, such as C++, designers of programmable logic familiar with such programming languages may have a reduced learning curve than designers that are required to learn unfamiliar low level hardware description languages to implement new functionalities in the IC.

The designers may implement their high level designs using design software 14, such as a version of Intel® Quartus® by Intel Corporation. The design software 14 may use a compiler 16 to convert the high level program into a low level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of a RNN 26 on the integrated circuit device 12. The RNN 26 may include circuitry and/or other logic elements and may be configured to implement activation functions.

Figure 2:
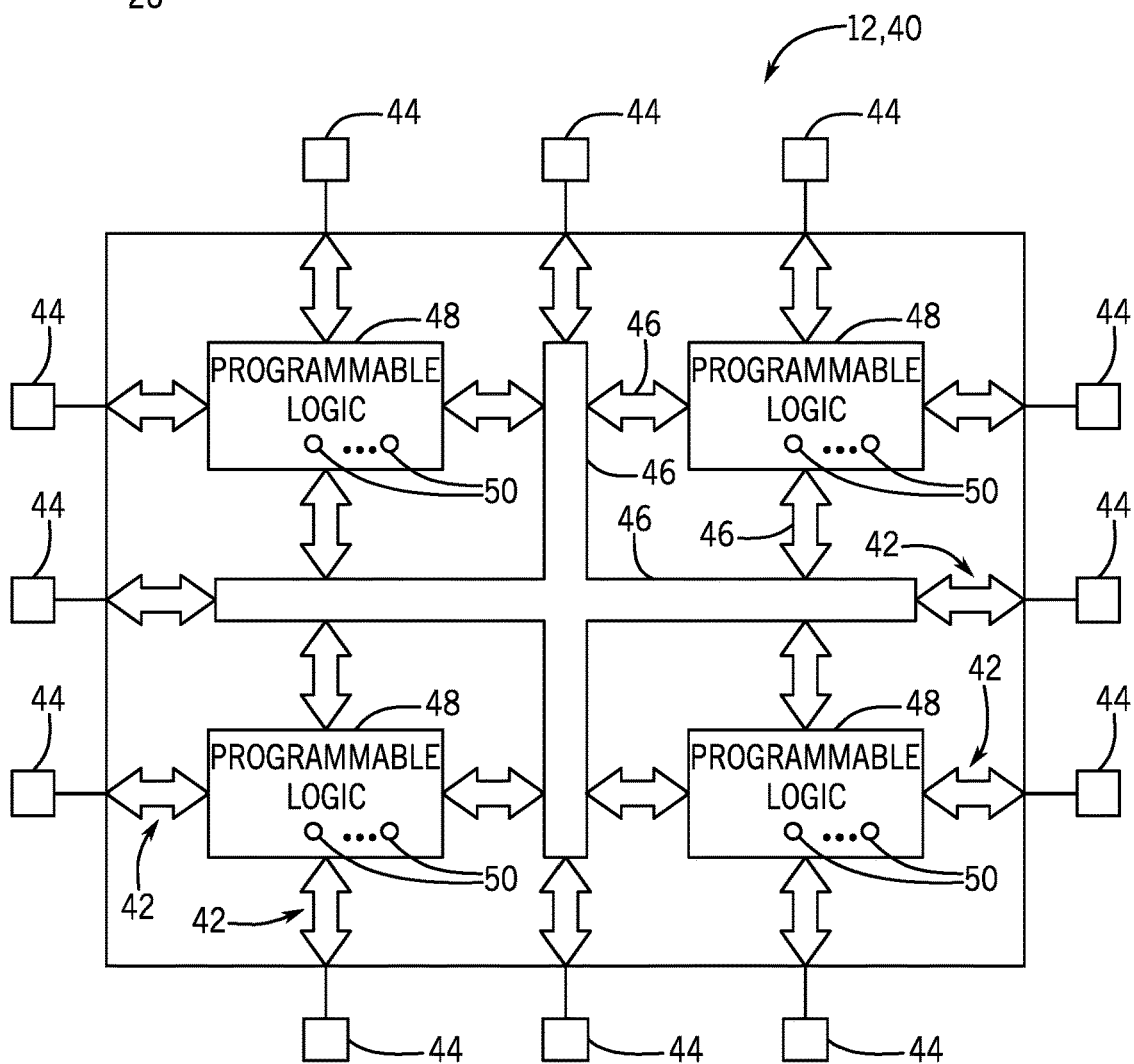
FIG. 2 is a block diagram of an integrated circuit where RNNs may be implemented, in accordance with an embodiment.

Turning now to a more detailed discussion of the integrated circuit device 12, FIG. 2 illustrates an integrated circuit device 12, which may be a programmable logic device, such as a field programmable gate array (FPGA) 40. For the purposes of this example, the device 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as FPGA 40, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

In some embodiments, the RNN 26 of the integrated circuit device 12 may utilize an activation function, such as a sigmoid function and/or a hyperbolic tangent function, in order to implement machine learning techniques. Further, in some embodiments, in order to increase efficiency, reduce a footprint (e.g., resources), and/or reduce latency associated with the computation and/or implementation of the activation functions, the integrated circuit device 12 may implement and/or compute the activation functions according to approximations described herein.

Figure 3:
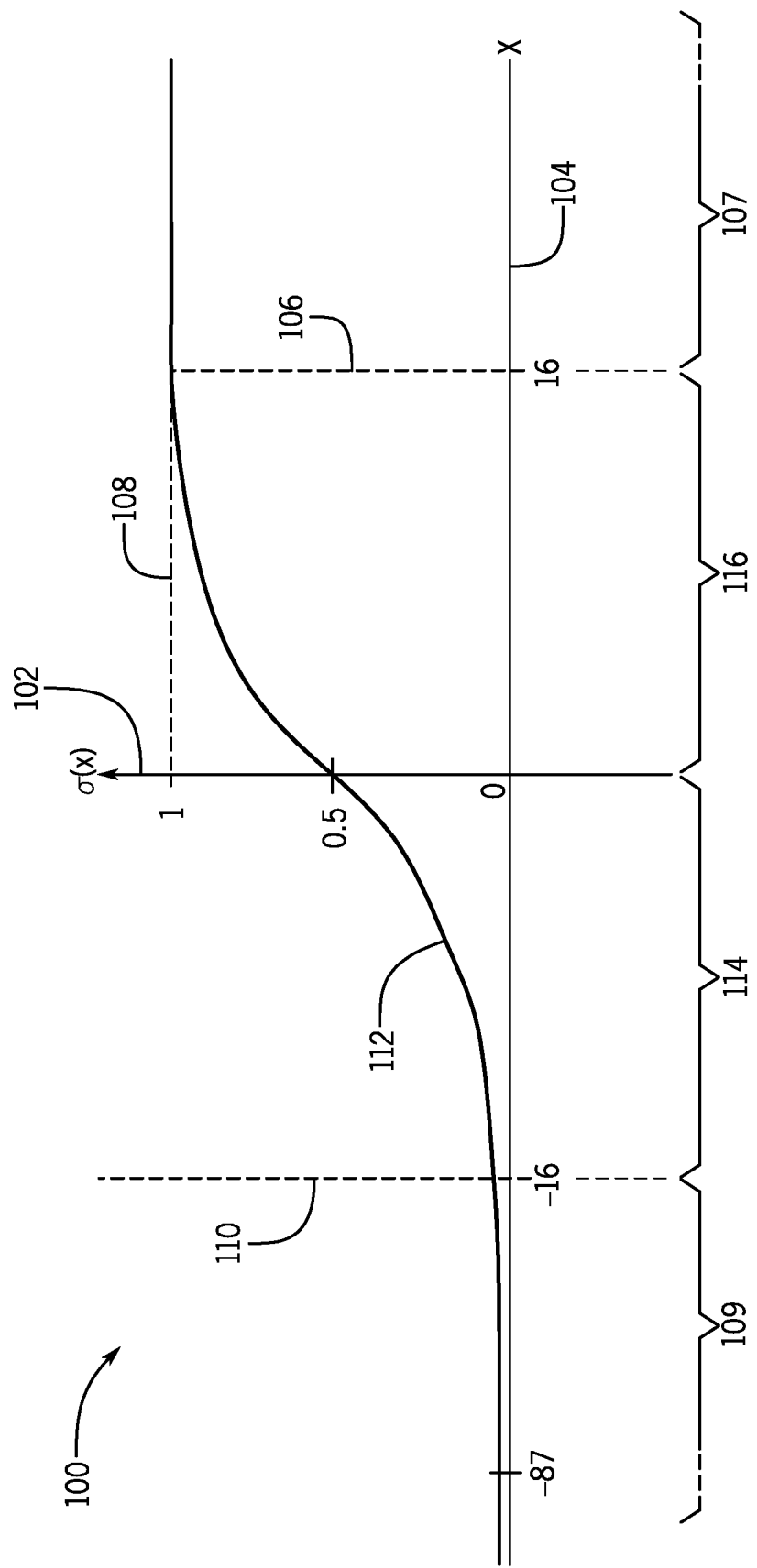
FIG. 3 is a plot of a sigmoid function, in accordance with an embodiment.

Turning now to FIG. 3, the sigmoid function ($\sigma(x)$), as defined by the equation:

$$\sigma(x) = \frac{1}{1+e^{-x}},$$

is illustrated in plot 100, where a vertical axis 102 denotes values of $\sigma(x)$ and a horizontal axis 104 denotes the values of an input, x, to the sigmoid function. As the curve 112, which plots the value of the sigmoid function for each value of the input x, demonstrates, as the value of x increases, using 1 as an approximation of the value of $\sigma(x)$ becomes increasingly accurate. As such, a positive input cut-off 106 may mark the value of x at which the curve 112 approximately saturates to 1, as denoted by asymptote 108. Similarly, a negative input cut-off 110 may mark the value of x at which the curve 112 approximately saturates to 0. Accordingly, the value of the curve 112 may be approximated as 1 within a positive saturation interval 107, and the value of the curve may be approximated as 0 within a negative saturation interval 109.

The location of the positive input cut-off 106 (e.g., the bounds of the positive saturation interval 107) and the location of the negative input cut-off 110 (e.g., the bounds of the negative saturation interval 109) may impact the accuracy of an approximation of the curve 112. For example, in single precision floating point number representation (e.g., a number representation having a sign bit, eight exponent bits, and twenty-three mantissa bits), approximating the value of the curve 112 as 1 within a positive saturation interval 107 having a positive input cut-off 106 of 15.24 may be accurate within 2 units in the last place (ULP) (e.g., two least significant bits). On the other hand, in half-precision floating point number representation (e.g., a number representation having a sign bit, five exponent bits, and ten mantissa bits), to approximate the value of the curve 112 with the same accuracy (2 ULPs), a positive input cut-off 106 of 6.23 may be suitable. Accordingly, as will be described in further detail below, any suitable bounds of the positive saturation interval 107 and the negative saturation interval 109 may be implemented according to a suitable accuracy bound (e.g., 2 ULPs), a number representation format, and/or the like used to approximate the sigmoid function.

Further, the value of the curve 112 along the remaining intervals of the plot 100 (e.g., a negative interval 114 and a positive interval 116) may be determined via a first identity:

$$\sigma(x)=1-\sigma(-x).$$

As such, the values of the curve 112 in the positive interval 116 may be approximated based on values of the curve 112 computed in the negative interval 114. To compute (e.g., approximate) the values of the curve 112 in the negative interval 114, the negative interval 114 may be split into a number (e.g., 256, 512, or the like) of uniformly or non-uniformly sized sub-intervals 152, as illustrated in the sub-plot 150 (e.g., portion of plot 100) of FIG. 4.

Figure 4:
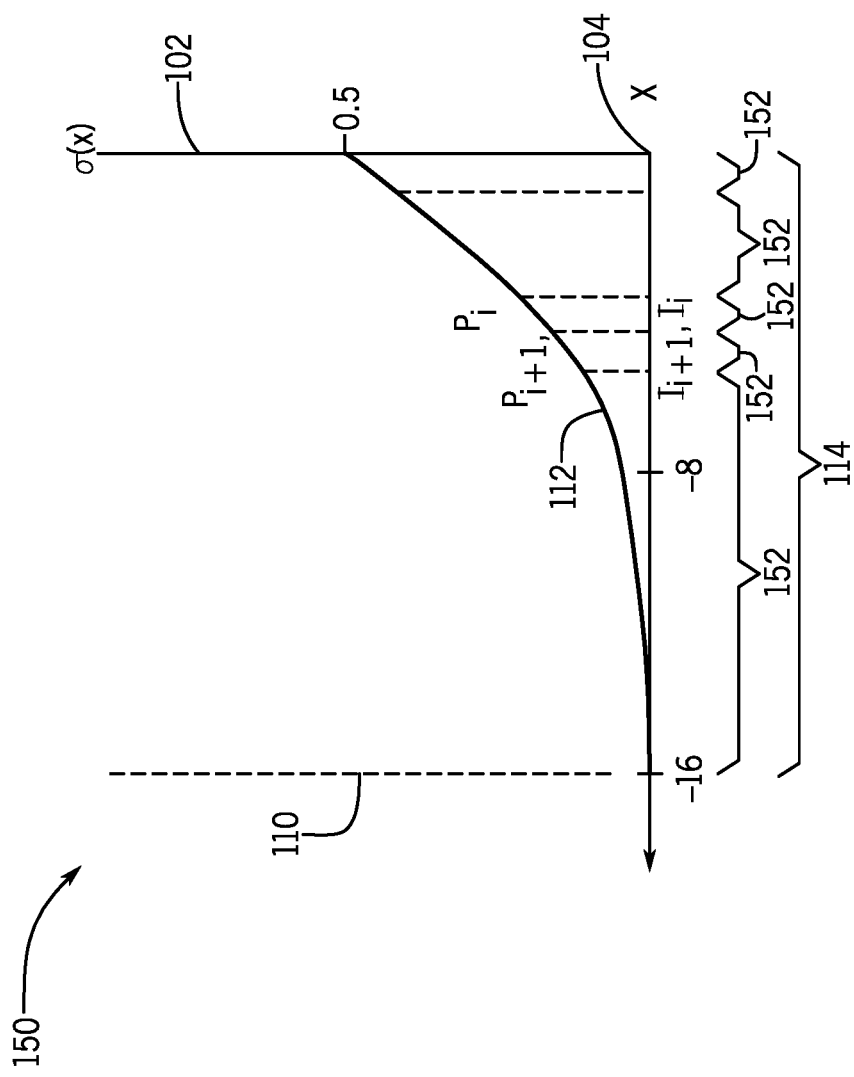
FIG. 4 is a sub-plot illustrating a portion of the plot of FIG. 3, in accordance with an embodiment.

As illustrated in FIG. 4, a piecewise polynomial approximation function (P), which may include a different polynomial function (e.g., $P_i$, $P_{i+1}$) mapped to each sub-interval 152, may be used to approximate the value of the curve 112 on each of the sub-intervals 152. As such, by combining each of the polynomial functions into the piecewise polynomial approximation function, approximations of the curve 112 along the entire negative interval 114 may be determined.

The size of each of the sub-intervals 152 may determine the accuracy of an approximation of the sigmoid function. A smaller sub-interval 152 may produce a more accurate approximation of the curve 112. However, dividing the negative interval 114 into smaller sub-intervals 152 may result in a greater number of sub-intervals 152 used to cover the negative interval 114, and because each polynomial mapped to a sub-interval 152 may include a set of coefficients, increasing the number of sub-intervals 152 may increase the number of coefficients used to approximate the curve 112. As such, the number of sub-intervals 152 may determine the number of polynomial coefficients to stored in memory, which may impact the resources (e.g., footprint) used to implement the approximation. Accordingly, a trade-off may exist between the accuracy of the approximations and the resources utilized to implement the approximations.

The degree of the piecewise polynomial may further impact the accuracy of the approximation of the sigmoid function. A higher degree polynomial may produce a more accurate approximation of the sigmoid function than a lower degree polynomial. However, higher degree polynomials may utilize additional coefficients when compared to lower degree polynomials. Further, additional hardware may be used to evaluate a higher degree polynomial, as will be discussed. As such, the degree of the polynomial used to approximate the sigmoid function in the negative interval 114 may impact both the accuracy of the approximation, as well as the resources used to implement the approximation.

In some embodiments, as described below, a $2^{nd}$ degree polynomial function may be suitable to approximate the sigmoid function on each sub-interval 152 of the negative interval 114. In other embodiments, a higher or lower degree polynomial function may be utilized in an approximation of the sigmoid function. As such, any suitable degree polynomial function, as well as any suitable number of sub-intervals 152, may be used to approximate the sigmoid function within a set accuracy bound (e.g., within 2 ULPs). In any case, each polynomial function included in the piecewise polynomial function may have the same degree, and as such, each polynomial function included in the piecewise polynomial function may utilize the same number of coefficients.

Further, in some embodiments, the values of the sigmoid function in the negative interval 114 and the positive interval 116 may be determined based on a second identity:

$$\sigma(-x)=1-\sigma(x).$$

As such, the values of the curve 112 in the negative interval 114 may be approximated based on values of the curve 112 computed in the positive interval 116. For example, the values of the curve 112 may be computed in the positive interval 116 according to a piecewise polynomial function, as described above with reference to the negative interval 114, and the negative interval 114 may be approximated based on the computed values of the curve 112 in the positive interval 116 and the second identity. In such embodiments, however, because the floating point representation the sigmoid function may have a large dynamic range on the negative interval 114 (e.g., approximately $2^{-24}$ to $2^{-1}$ for a negative interval 114 of x=(−16, 0]) compared to its range on the positive interval 116 (e.g., $2^{-1}$ to approximately $2^0$ for a positive interval 116 of x=(0, 16)), to avoid a loss in accuracy when compared to the embodiments utilizing the first identity, a higher precision (e.g., double precision) floating point representation may be used. That is, using the second identity in the same precision to determine the values of sigmoid in the negative interval 114 may result in cancellation of values and greater inaccuracy when compared to determining the values of the curve 112 in the positive interval 116 with the first identity, as the negative interval 114 of the plot 100 has a greater number of representable values in floating point representation.

Figure 5:
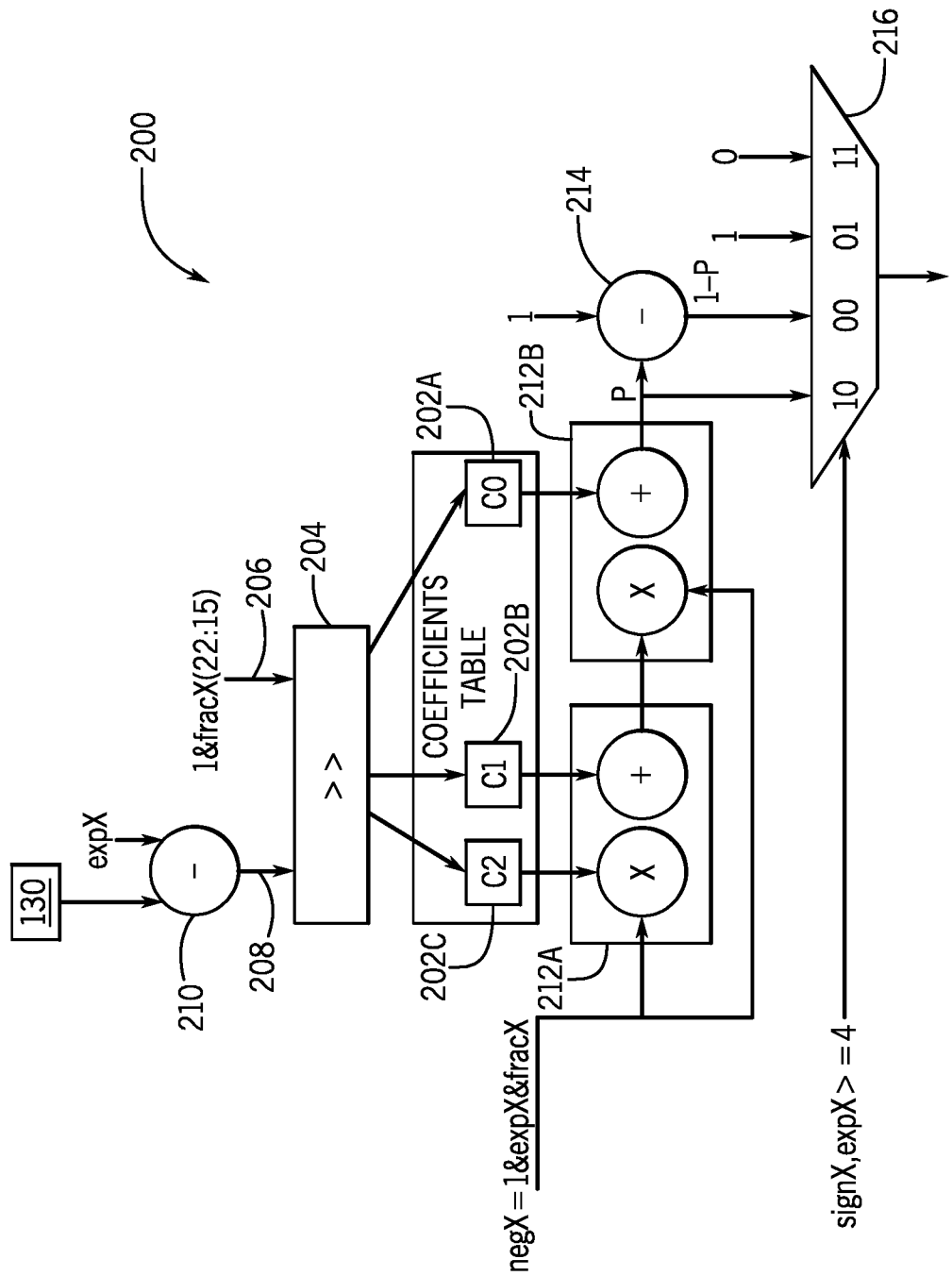
FIG. 5 is a block diagram illustrating a sigmoid approximation circuit which may approximate the sigmoid function of FIG. 3 in single precision floating point, in accordance with an embodiment.

Turning now to FIG. 5, a sigmoid approximation circuit 200 may be used to calculate the sigmoid function according to the approximations described above. As such, the sigmoid approximation circuit 200 may compute an approximation of the sigmoid function in the negative interval 114, in the positive interval 116, in the positive saturation interval 107, and in the negative saturation interval 109 and may then select the approximation of the sigmoid function corresponding to an input value x.

In order to compute an approximation of the sigmoid function in the negative interval 114, the sigmoid approximation circuit 200 may implement a piecewise polynomial function, as described above. In some embodiments, the piecewise polynomial function may be a second degree polynomial function, which may be represented as $C0+C1*x+C2*x^2$.

Accordingly, the sigmoid approximation circuit 200 may include coefficient tables 202A-C that may store a suitable set of coefficients (e.g., C0, C1, and C2, respectively) for each polynomial function in the piecewise polynomial function. The coefficient tables 202A-C may be indexed according to the sub-interval 152 (e.g., the polynomial function) each set of coefficients is mapped to. In some embodiments, for example, the coefficient table 202 may contain a fixed-point index (e.g., address) mapping each set of coefficients to a respective input (e.g., value of x) representative of a sub-interval 152. For example, the coefficient tables 202A-C may contain an 8-bit fixed-point address (e.g., 256 unique combinations) indexing each set of coefficients to 256 different sub-intervals 152 and may contain a 9-bit fixed-point address (e.g., 512 unique combinations) to index each set of coefficients to 512 different sub-intervals 152. As such, when the negative interval 114 of the sigmoid function is divided into 512 sub-intervals, the coefficients table 202 may receive a 9-bit fixed-point input and may output the set of coefficients indexed by the 9-bit fixed-point input.

A barrel shifter 204 may generate the fixed-point input that may map uniquely to a sub-interval 152. To do so, because, as shown in illustrated embodiment, the input x is represented in single precision floating point, the barrel shifter 204 may convert x to a fixed-point representation. As such, in the case of 512 sub-intervals 152, for example, the barrel shifter 204 may receive the most significant eight bits of the mantissa of x (e.g., fracX(22:15)) concatenated to the left with an implicit bit (1) (e.g., 1& fracX(22:15)) as a first input 206 and may receive a shift value as a second input 208. A subtractor 210 may output the shift value as a result of the operation 130−expX, or the exponent of x (expX) subtracted from 130 (e.g., a bias value (127)+3). The barrel shifter 204 may then right shift the first input 206 by the shift value received as the second input 208 to generate the 9-bit fixed-point input to the coefficients table 202. In some embodiments, the 9-bit fixed point input may contain four integer bits and five fraction bits. Accordingly, shifting the first input 206 according to 130−expX may align the first input 206 to the correct decimal position in the 9-bit fixed-point format. That is, the value 127 may account for the bias inherently built into the exponent of x and the value of 3 may account for the decimal position of the 9-bit fixed-point so that an exponent value of 130, for example, may not result in any shifting of the first input 206, as the first input is already aligned with the 9-bit fixed-point format.

Along with the coefficient tables 202A-C, the sigmoid approximation circuit 200 may implement a result of a piecewise polynomial approximation function using a first multiply-add block 212A and a second multiply-add block 212B. Both the first multiply-add block 212A and the second multiply-add block 212B may respectively map to (e.g., fit within) a different single precision hard floating point digital signal processing (DSP) block.

In some embodiments, regardless of a sign of the input x, the first multiply-add block 212A may receive the exponent of x, the mantissa of x, and a negative sign as an input (e.g., 1&expX&fracX). That is, the first multiply-add block 212A may receive −x (e.g., negX), as the piecewise polynomial functions may be used to compute the value of the sigmoid function in the negative interval 114. The first multiply-add block 212A may then multiply negX by a second degree coefficient (C2) received from the coefficient table 202C. The first multiply-add block 212A may further add the product of negX*C2 with a first degree coefficient (C1) received from the coefficient table 202B to output (negX*C2+C1) to the second multiply-add block 212B.

As discussed above, the second multiply-add block 212B may receive (negX*C2+C1) as an input and may multiply this value by negX, which the second multiply-add block 212B may also receive as an input. The second multiply add block 212B may then add this product (e.g., negX* (negX*C2+C1)) with a zeroth degree coefficient (C0) received from the coefficient table 202A. As such, the output of the second multiply-add block 212B may represent the output of a piecewise polynomial function (P) (e.g., C0+negX*(negX*C2+C1)), which may be rewritten as $C2*negX^2+C1*negX+C0$. Accordingly, based on the value of the input x, as well as the coefficients indexed by the value of x in the coefficient tables 202A-C, the first multiply-add block 212A and the second multiply-add block 212B may operate to compute an approximation of the sigmoid function in the negative interval 114 based on a suitable piecewise polynomial function.

Further, as discussed earlier, to determine an approximation of the sigmoid function in the positive interval 116, the first identity may be used. Accordingly, the sigmoid approximation circuit 200 may contain a subtractor 214 (e.g., a single-precision floating point subtractor mapped to a DSP block) that may receive the output of the piecewise polynomial function (P) from the second multiply-add block 212B and may subtract P from 1 to generate an approximation of the sigmoid function in the positive interval 116.

The sigmoid approximation circuit 200 may further include a multiplexer (mux) 216 configured to receive the values of P, 1-P, 1, and 0 (e.g., approximations of the sigmoid function in the negative interval 114, the positive interval 116, the positive saturation interval 107, and the negative saturation interval 109, respectively). That is, the sigmoid approximation circuit 200 may generate approximations of the value of the sigmoid function for each interval the input x may reside in and may select an appropriate approximation at a mux 216 based on an actual interval the input x resides in. As such, the mux 216 may receive a select signal to select an approximation of an output of the sigmoid function for that value of x. In some embodiments, the select signal may include a sign of the input x (e.g., signX) and information related to the exponent of x (expX). In such embodiments, the select signal may indicate whether the input x is positive or negative and whether the input x is in the positive saturation interval 107 or the negative saturation interval 109. For example, in embodiments with a positive input cut-off 106 of 16 and a negative input cut-off 110 value of −16, the select signal may include a value indicating whether expX is greater than or equal to 4 (e.g., expX>=4), which may indicate whether the value of x is greater than or equal to 16 (e.g., $2^4$=16), as the absolute value of the mantissa of x is greater than or equal to 1 and less than 2. As such, a select signal value 10 may represent a value of x that is negative and has an exponent less than 4 (e.g., a value of x in the negative interval 114), a select signal value 00 may represent a value of x that is positive and has an exponent less than 4 (e.g., a value of x in the positive interval 116), a select signal value of 01 may represent a value of x that is positive and has an exponent greater than or equal to 4 (e.g., a value of x in the positive saturation interval), and a select signal value of 11 may represent a negative value of x that has an exponent greater than or equal to 4 (e.g., a value of x in the negative saturation region). Accordingly, based on the sign of the input x and the exponent of x, the sigmoid approximation circuit 200 may output, via the mux 216, a suitable approximation of the sigmoid function for the input x.

Figure 6:
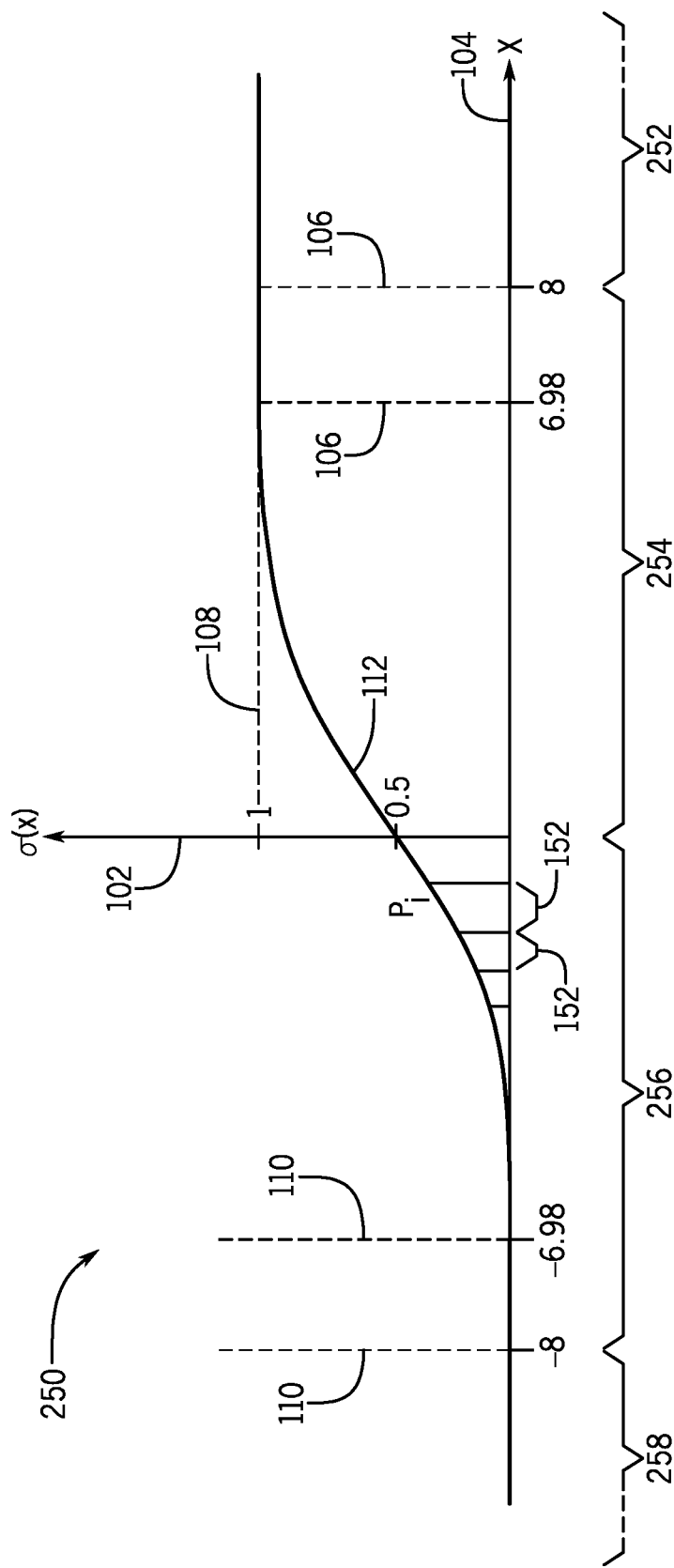
FIG. 6 is a second plot of the sigmoid function of FIG. 3, in accordance with an embodiment.

As discussed above, approximations for a sigmoid function implemented in half-precision floating point format (e.g., a number representation format including a sign bit, five exponent bits, and ten mantissa bits) may have different values of x to achieve the same accuracy bound (e.g., 2 ULPs) as approximations for the sigmoid function implemented in single-precision floating point format. Accordingly, FIG. 6 illustrates a second plot 250 of a sigmoid function implemented in half-precision floating point format. In half-precision floating point format, an approximation of the value of the sigmoid function saturating to 1 (e.g., asymptote 108) may be accurate within 1 ULP for an input value of x greater than or equal to 6.98, as denoted by the positive input cut-off 106, and an approximation of the value of the sigmoid function saturating to 0 may be accurate within 1 ULP for an input value of x less than or equal to −6.98, as denoted by the negative input cut-off 110. However, in some embodiments, the positive input cut-off 106 and the negative input cut-off 110 may be rounded to 8 and −8, respectively to round each cut-off value (e.g., 106 and 110) to a closest power of two, which may facilitate efficient generation of uniformly sized sub-intervals 152. Further, in such embodiments, a second positive saturation interval 252 marks the values of x where x is greater than or equal to 8, and a second negative saturation interval 258 marks the values of x where x is less than or equal to −8.

Further, similar to the approach involved with the single precision floating point format, to approximate the values of the sigmoid function on a remaining interval of x (e.g., where x is greater than −8 and less than 8), the remaining interval may be sectioned into a second positive interval 254, where x is greater than 0 and less than 8 (e.g., x=(0, 8)) and a second negative interval 256, where x is greater than −8 and less than or equal to 0 (e.g., x=(−8, 0]). In some embodiments, because the sigmoid function has a greater dynamic range in the second negative interval 256 than in the second positive interval 254, an approximation of the sigmoid function may be computed through a piecewise polynomial function computed across sub-intervals 152 of the second negative interval 256, and based on the approximation of the sigmoid function in the second negative interval 256, an approximation of the sigmoid function in the second positive interval 254 may be determined based on the first identity. Further, in some embodiments, the piecewise polynomial function may include a first degree polynomial for each sub-interval 152 of the curve 112, as the half-precision implementation may achieve the same accuracy bounds (e.g., within 1 ULP) as the single precision implementation with a less precise approximation.

Figure 7:
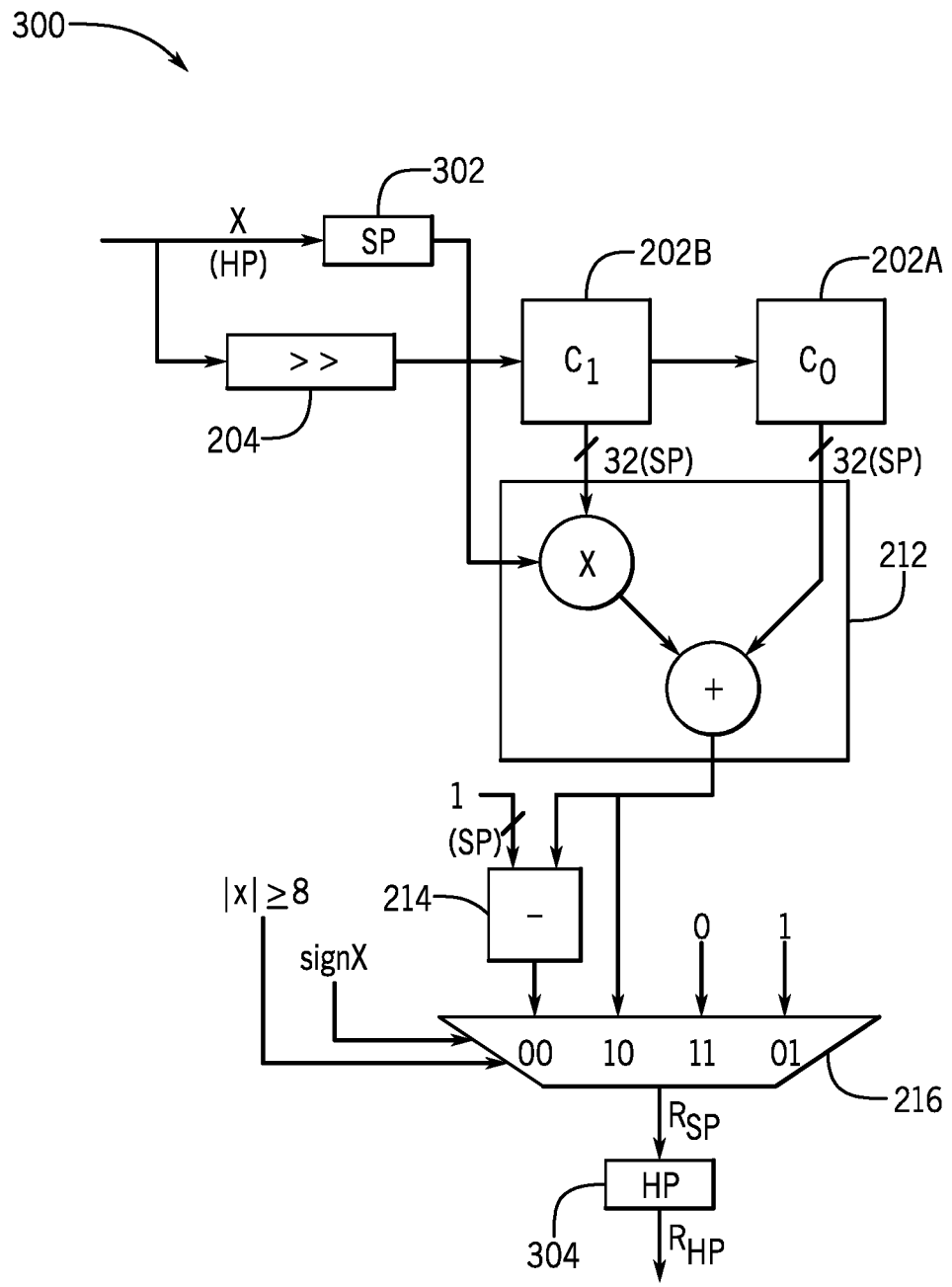
FIG. 7 is a block diagram illustrating a half-precision sigmoid approximation circuit which may approximate the sigmoid function of FIG. 6 in half-precision floating point, in accordance with an embodiment.

Turning now to FIG. 7, the approximations discussed above may be implemented according to a first half-precision sigmoid approximation circuit 300. In the illustrated embodiment, because a first degree piecewise polynomial function may be sufficient to suitably approximate a value of the sigmoid function within a suitable accuracy bound, the first sigmoid half-precision sigmoid approximation circuit 300 may include coefficient tables 202A-B that may include a zeroth degree coefficient (C0) and a first degree coefficient (C1), respectively, mapped to each sub-interval 152. To access each indexed (e.g., mapped) coefficient, similar to the sigmoid approximation circuit 200, the first half-precision sigmoid approximation circuit 300 may include a barrel shifter 204 that may convert the input x from a floating point representation to a fixed point representation. More specifically, in some embodiments, the barrel shifter 204 may convert the input x to a 6-bit fixed-point value having three integer bits and three fraction bits. In such embodiments, the 6-bit fixed-point value may map to 64 different sub-intervals 152; though, in other embodiments, a different precision value and number of sub-intervals 152 may be used. Further, to convert the input x to a suitable fixed-point value, the barrel shifter 204 may receive the top five bits in from the mantissa (e.g., fraction) of x (fracX(9:5)) concatenated with an implicit bit (1) (e.g., 1 & fracX(9:5)) and may receive a shift value, which may be obtained according to the value of the exponent of x (expX) subtracted from two (e.g., 2−expX) and may be used to right-shift the 1&fracX to the correct decimal alignment in the 6-bit fixed-point format.

Further, upon receiving the 6-bit fixed-point value indexing the one or more coefficients tables 202 from the barrel shifter 204, the coefficient tables 202A-B may output the zeroth degree coefficient (C0) and the first degree coefficient (C1), respectively, to a multiply-add block 212. Because the multiply-add block 212 and/or additional hardware components in the first half-precision sigmoid approximation circuit 300 may operate in single precision floating point representation, the coefficient tables 202A-B may store each coefficients (e.g., C0 and C1, respectively) in single precision floating point format. Further, as the multiply-add block 212 may also receive the input x as an input in order to generate the polynomial function C0+C1*x, the first half-precision sigmoid approximation circuit 300 may convert the input x from a half-precision floating point number to a single-precision floating point number prior to inputting x to the multiply-add block 212. Accordingly, the first half-precision sigmoid approximation circuit 300 may include a half-precision conversion block 302, which may include circuitry and/or soft logic to cast the input x from a half-precision floating point number to a single precision floating point number. To do so, the half-precision conversion block 302 may update the exponent of x (expX) according to a new bias value (e.g., 127−15) and may right pad the mantissa of x with thirteen zeros. Further, during the conversion operation, the conversion block 302 may force the sign of x negative (e.g., 1).

Accordingly, the multiply-add block 212 may receive a single precision value of the input x and may multiply the single precision value of the input x by the first degree coefficient (C1) to generate C1*x. The multiply-add block may then add C0 to this output to generate an output C1*x+C0, which is the result of a first degree polynomial that may approximate the sigmoid function in the second negative interval 256.

The first half-precision sigmoid approximation circuit 300 may then approximate the sigmoid function in the second positive interval 254 based on the first identity, where the value of σ(−x) is determined by the output C1*x+C0. In the illustrated embodiment, for example, a subtractor 214 may receive the output C1*x+C0 and may subtract it from a single precision value of 1 to generate an approximation of the sigmoid function in the second positive interval 254.

In some embodiments, similar to the sigmoid approximation circuit 200, the first half-precision sigmoid approximation circuit 300 may include a mux 216 configured to receive the approximation of the sigmoid function in the second positive interval 254 (e.g., 1−(C1*x+C0)), the approximation of the sigmoid function in the second negative interval 256 (e.g., C1*x+C0), the approximation of the sigmoid function in the second positive saturation interval 252 (e.g., 1), and the approximation of the sigmoid function in the second negative saturation interval 258 (e.g., 0). Further, the first half-precision sigmoid approximation circuit 300 may approximate the sigmoid function for an input x by selecting one of the inputs to the mux 216 listed above based on a sign of the input x and a value of expX. To determine if the absolute value of x is greater than or equal to 8 (e.g., to determine whether x is in either the second negative saturation interval 258 or the second positive saturation interval 252), the mux 216 may receive a signal indicating whether expX is greater than or equal to 3, or whether the biased expX is greater than or equal to 15+3. As such, a value of x less than or equal to −8 may generate a select signal of 11, which may select the approximation of the sigmoid signal mapped to the second negative saturation interval 258 (e.g., 0) from the mux 216, a value of x greater than −8 and less than 0 may generate a select signal of 10, which may select the approximation of the sigmoid function mapped to the second negative interval 256 from the mux 216, a value of x greater than or equal to 0 and less than 8 may generate a select signal of 00, which may select the approximation of the sigmoid function mapped to the second positive interval 254 from the mux 216, and a value of x greater than or equal to 8 may generate a select signal of 01, which may select the approximation of the sigmoid function mapped to the second positive saturation interval 252 from the mux 216.

As each of the mux 216 outputs may represent a single precision floating point value, the first half-precision sigmoid approximation circuit 300 may include a single precision conversion block 304, which may include circuitry and/or soft logic to cast the output of the mux 216 (e.g., a selected approximation of the sigmoid function) from a single precision floating point number to a half-precision floating point number. To do so, the single precision conversion block 304 may truncate and/or round the mantissa of the output of the mux 216 from 23 bits to 10 bits. Further, to rebias the exponent of the output of the mux 216, the single precision conversion block 304 may subtract a value (e.g., 127−15) from the exponent of the output of the mux 216. In some embodiments, the single precision conversion block 304 may further check for exponent overflow and/or underflow and may adjust the mantissa of the output of the mux 216 accordingly. As such, the output of the first half-precision sigmoid approximation circuit 300 may be represented in half-precision floating point format.

In some embodiments, operations involved in determining the approximation of the sigmoid function in the second positive interval 254 may form a critical path in the first half-precision sigmoid approximation circuit 300. As such, operations involving the barrel shifter 204, indexing the one or more coefficients tables 202, performing the multiplication and addition operations at the multiply-add block 212, performing subtraction at the subtractor 214, selecting an output from the mux 216, and casting the output of the mux 216 to half-precision may determine the latency of the first half-precision sigmoid approximation circuit 300 architecture. Further, latency contributed by the DSP blocks (e.g., multiply-add block 212 and subtractor 214) may have the greatest impact on the total latency of the sigmoid approximation circuit 200 architecture. Accordingly, in some embodiments, a different architecture to approximate the sigmoid function in half-precision format may improve the total latency contributed by the DSP blocks.

Figure 8:
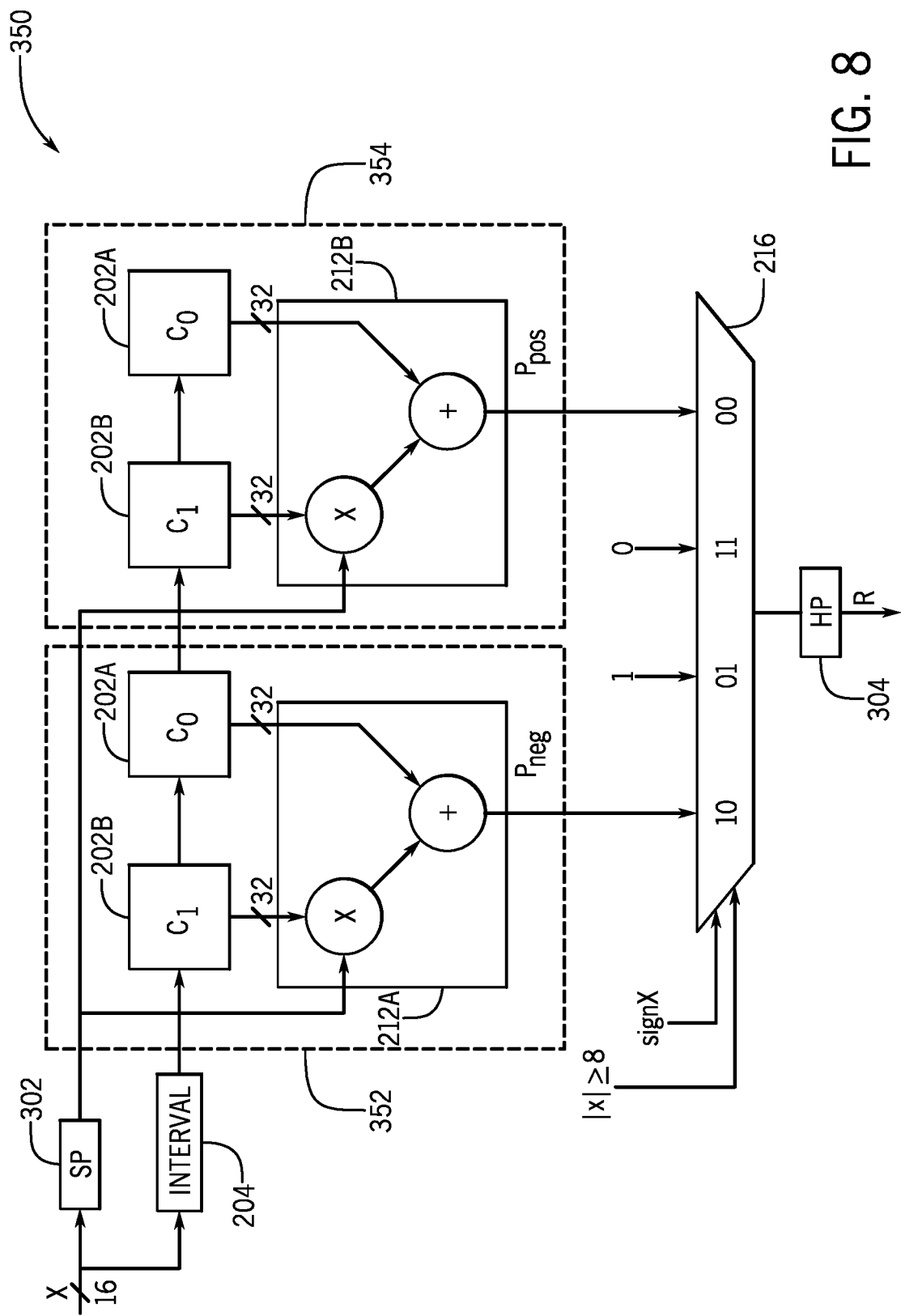
FIG. 8 is a second embodiment of the half-precision sigmoid approximation circuit of FIG. 7.

Turning now to FIG. 8, a second half-precision sigmoid approximation circuit 350 may have a shorter critical path when compared to the first half-precision sigmoid approximation circuit 300. As shown in the illustrated embodiment, the second half-precision sigmoid approximation circuit 350 may contain a first datapath 352 that may generate an approximation of the sigmoid function in the second negative interval 256, which may resemble the architecture of the first half-precision sigmoid approximation circuit 300. The second half-precision sigmoid approximation circuit 350 may further include a second datapath 354 that may generate an approximation of the sigmoid function in the second positive interval 254. The second datapath 354 may be independent from calculations and/or operations involved with the first datapath 352. As such, because the approximation of the sigmoid function in the second positive interval 254 (e.g., the second datapath 354) may not depend on an approximation of the sigmoid function in the second negative interval 256 (e.g., the first datapath 352), both the approximation of the sigmoid function in the second positive interval 254 and the approximation of the sigmoid function in the second negative interval 256 may be computed in parallel. Thus, while the subtractor 214 of the first half-precision sigmoid approximation circuit 300 may compute the approximation of the sigmoid function in the second positive interval 254 after the approximation of the sigmoid function in the second negative interval 256 is computed, the second half-precision sigmoid approximation circuit 350 may compute both approximations substantially simultaneously, thereby reducing the latency of the second half-precision sigmoid approximation circuit 350 architecture in comparison with the first half-precision sigmoid approximation circuit 300.

Figure 9:
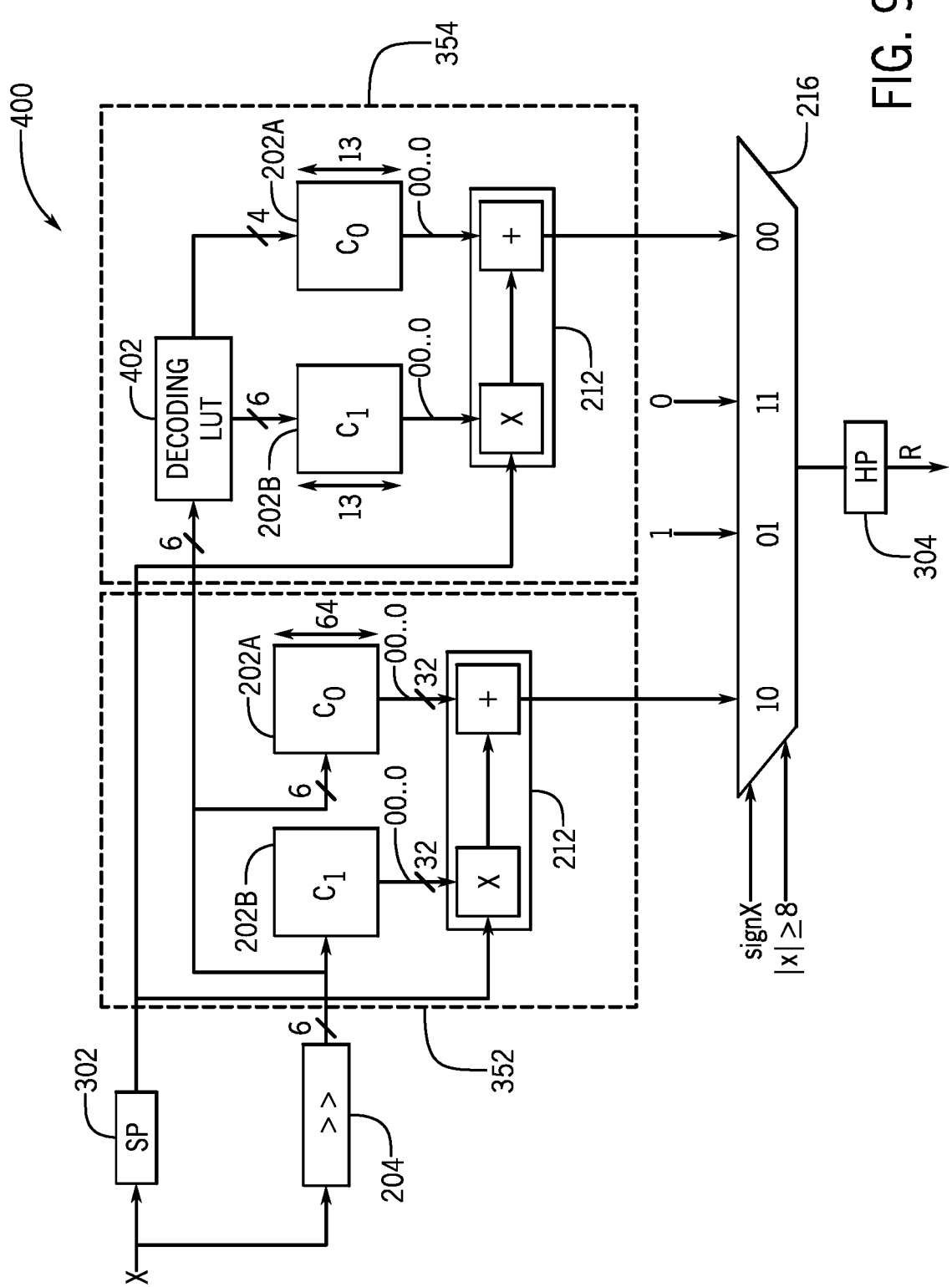
FIG. 9 is a third embodiment of the half-precision sigmoid approximation circuit of FIG. 7.

However, because both the first datapath 352 and the second datapath 354 of the second half-precision sigmoid approximation circuit 350 may each include coefficient tables 202A-B, the second half-precision sigmoid approximation circuit 350 may utilize additional memory (e.g., resources) to store the coefficient tables 202A-B when compared to the first half-precision sigmoid approximation circuit 300. Accordingly, a third half-precision sigmoid approximation circuit 400, as illustrated in FIG. 9, may improve upon the architecture of the second half-precision sigmoid approximation circuit 350 by reducing the resources utilized to approximate the sigmoid function. In some embodiments, because approximations of the sigmoid function in the second positive interval 256 may be simpler to compute than approximations of the sigmoid function in the second negative interval 256, the piecewise polynomial function utilized in the second datapath 354 may contain fewer sub-intervals 152 than the piecewise polynomial function of the first datapath 352. For example, in some embodiments, because the dynamic range of the sigmoid function in the second positive interval 254 is smaller than the dynamic range of the sigmoid function in the second negative interval 256, as discussed above, the piecewise polynomial function of the second datapath 354 may be implemented in twelve, non-uniform sub-intervals 152 to meet a certain accuracy bound (e.g., 1 ULP). As such, the one or more coefficient tables of the second datapath 354 may contain fewer coefficients, which may utilize less memory.

As the second datapath 354 may include fewer coefficients in the coefficient tables 202A-B, a decoding look-up-table (LUT) 402 may map the output of the barrel shifter to an index of coefficients in the coefficient tables 202A-B. In some embodiments, for example, the approximation of the sigmoid function in the second negative interval 256 may utilize 64 sub-intervals 152, or 64 coefficients in each coefficient table 202A-B of the first datapath 352, while the approximation of the sigmoid function in the second positive interval 254 may utilize 12 sub-intervals, or 12 coefficients in each coefficient table 202A-B of the second datapath 354. In such embodiments, the coefficient tables 202A-B of the first datapath 352 may receive a 6-bit index (e.g., 64 possible combinations) to uniquely map each of the 64 coefficients to a respective sub-interval 152 in the second negative interval 256, while a 4-bit index (e.g., 16 possible combinations) may suitably map each of the 12 coefficients of the coefficient tables 202A-B in the second datapath 354 to a respective sub-intervals 152 of the second positive interval 254. Therefore, as illustrated in FIG. 9, the third half-precision sigmoid approximation circuit 400 may include the decoding LUT 402 that may receive the same 6-bit fixed point output from the barrel shifter 204 that the first datapath 352 receives for an input x, and the decoding LUT 402 may map the 6-bit fixed point value to a 4-bit fixed point that may index a suitable sub-interval 152 in the second positive interval 254.

Further, while coefficient tables 202A-B may store single precision coefficients, in some embodiments, the coefficients may be stored in a lower precision format, such as half-precision. In such embodiments, the coefficient tables 202 may occupy less space and/or use fewer memory resources, as each coefficient stored may occupy fewer bits. In the illustrated embodiment, for example, the coefficients may occupy 22 bits compared to the 32 bits occupied by a single precision coefficient, as the trailing (e.g., least significant) ten bits from the mantissas of the single precision coefficients may be removed to generate the smaller, 22-bit coefficients. However, in order for hardware implemented to handle single precision values (e.g., multiply-add block 212) to receive and/or operate upon the coefficients, the third half-precision sigmoid approximation circuit 400 may convert coefficients output from the coefficient tables 202A-B to single precision format. For example, as illustrated in the example of FIG. 9, the third half-precision sigmoid approximation circuit 400 may concatenate ten zeros to the trailing end of the mantissa of a coefficient output by the coefficient tables 202 to generate a single precision coefficient that the multiply-add block 212 may suitably receive as an input.

Figure 10:
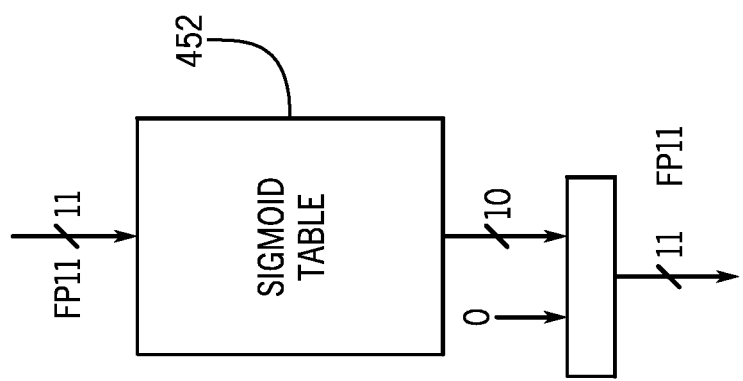
FIG. 10 is a block diagram illustrating a low-precision sigmoid approximation circuit, in accordance with an embodiment.

An additional architecture may generate approximations of the sigmoid function in floating point precisions containing eleven bits (FP11) or fewer (e.g., low precision). Accordingly, FIG. 10 is a low-precision sigmoid approximation circuit 450 that may generate approximations of the sigmoid function having low precisions. The low-precision sigmoid approximation circuit 450 may include a sigmoid table 452 (e.g., a LUT) that may map an input value to an output according to the sigmoid function. In some embodiments, for example, the sigmoid table 452 may contain pre-computed approximations of the sigmoid function for a set of input values and may output a suitable pre-computed approximation of the sigmoid function according to the input value received. Further, the sigmoid table 452 may receive an input including a certain number of bits, which may include a sign bit, and may generate an output with at least one fewer bit than the certain number of bits (e.g., an output without a sign bit). For example, in the illustrated embodiment, the sigmoid table 452 may receive a signed, 11-bit input and may output an unsigned, 10-bit output. The low-precision sigmoid approximation circuit 450 may then concatenate a zero (e.g., a positive sign bit) to the 10-bit output, as the value of the sigmoid function is always greater than or equal to zero. As such, the sigmoid table 452 may store sigmoid approximation outputs occupying fewer bits than sigmoid approximation outputs including a sign bit.

Figure 11:
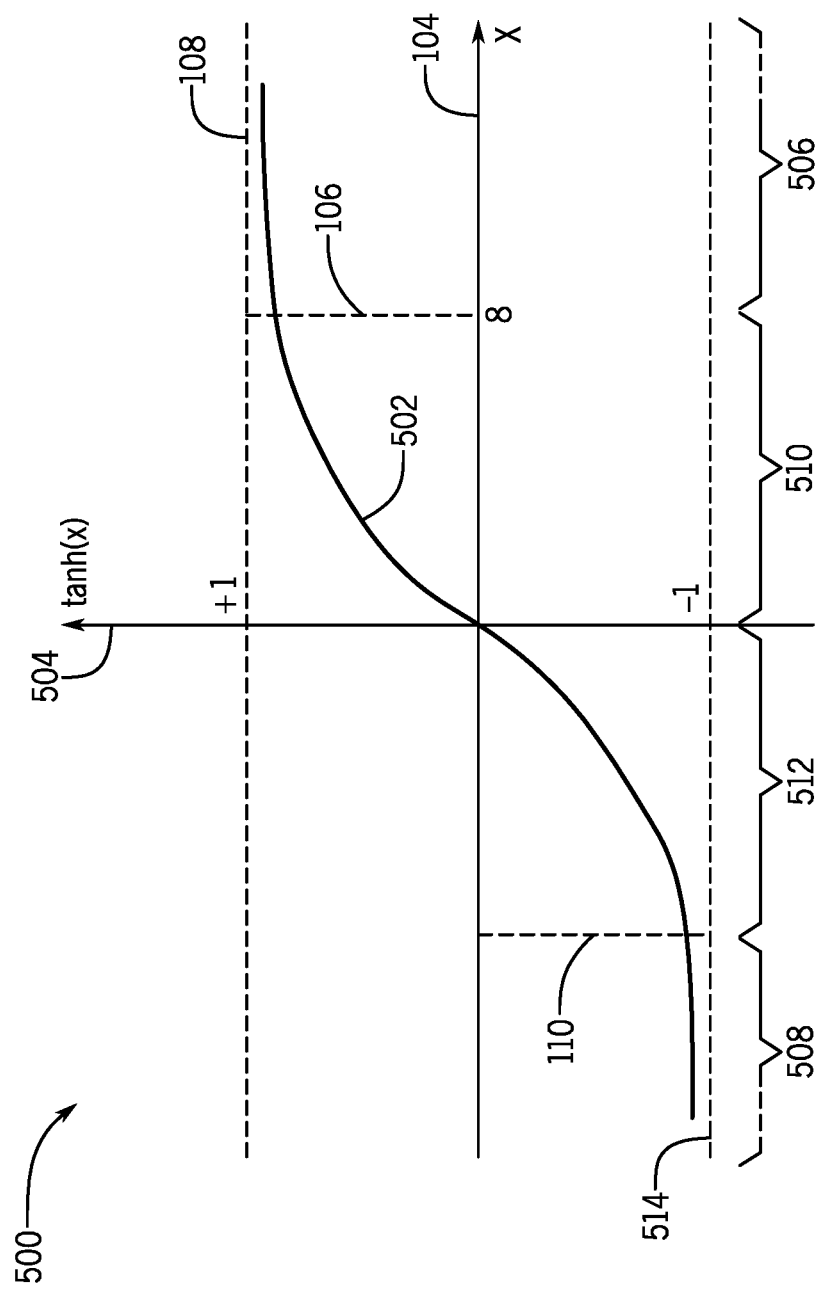
FIG. 11 is a plot of a hyperbolic tangent function, in accordance with an embodiment.

In addition to the sigmoid function, the hyperbolic tangent function (tan h) is commonly utilized as a machine-learning activation function. Accordingly, FIG. 11 illustrates a third plot 500 of the tan h function, as defined by the equation:

$$\tanh(x) = \frac{e^{2x} - 1}{e^{2x} + 1},$$

where a second vertical axis 504 denotes values of tan h(x) and the horizontal axis 104 denotes the values of x. As the second curve 502, which plots the value of the hyperbolic tangent function for each value of the input x, demonstrates, as the value of x increases, using 1 as an approximation of the value of tan h(x) becomes increasingly accurate. As such, the positive input cut-off 106 may mark the value of x at which the second curve 502 approximately saturates to 1, as denoted by asymptote 108. Similarly, the negative input cut-off 110 may mark the value of x at which the second curve 502 approximately saturates to −1, as denoted by negative asymptote 514. Accordingly, the value of the second curve 502 may be approximated as 1 within a third positive saturation interval 506, and the value of the curve may be approximated as −1 within a third negative saturation interval 508.

As discussed with respect to the sigmoid function, the location of the positive input cut-off 106 (e.g., the bounds of the third positive saturation interval 506) and the location of the negative input cut-off 110 (e.g., the bounds of the third negative saturation interval 508) may impact the accuracy of an approximation of the second curve 502. Accordingly, any suitable bounds of the third positive saturation interval 506 and the third negative saturation interval 508 may be implemented according to a suitable accuracy bound (e.g., 2 ULPs), a number representation format, and/or the like used to approximate the sigmoid function.

Further, because hyperbolic tangent is an odd function (e.g., symmetric about the origin), the value of the second curve 502 along the remaining intervals of the third plot 500 (e.g., a third negative interval 512 and a third positive interval 510) may be determined via a third identity:

$$\tan h(-x) = -\tan h(x).$$

As such, the values of the second curve 502 in the third negative interval 512 may be approximated based on values of the second curve 502 computed in the third positive interval 510. To compute (e.g., approximate) the values of the second curve 502 in the third positive interval 510, an odd, fifth degree piecewise polynomial function of the hyperbolic tangent function may approximate the third positive interval 510 across a number (e.g., 256, 512, or the like) of sub-intervals 152. Accordingly, each polynomial in the odd, fifth degree piecewise polynomial function may take the form:

$$P = x(C1 + x^2(C3 + C5x^2)),$$

and may have coefficients (e.g., C1, C3, and C5) mapped to a respective sub-interval 152.

The size of each of the sub-intervals 152 may determine the accuracy of an approximation of the hyperbolic tangent function. A smaller sub-interval 152 may produce a more accurate approximation of the second curve 502. However, dividing the third positive interval 510 into smaller sub-intervals 152 may result in a greater number of sub-intervals 152 used to cover the third positive interval 510, and because each polynomial mapped to a sub-interval 152 may include a set of coefficients, increasing the number of sub-intervals 152 may increase the number of coefficients used to approximate the second curve 502. As such, the number of sub-intervals 152 may determine the number of polynomial coefficients to stored in memory, which may impact the resources (e.g., footprint) used to implement the approximation.

Figure 12:
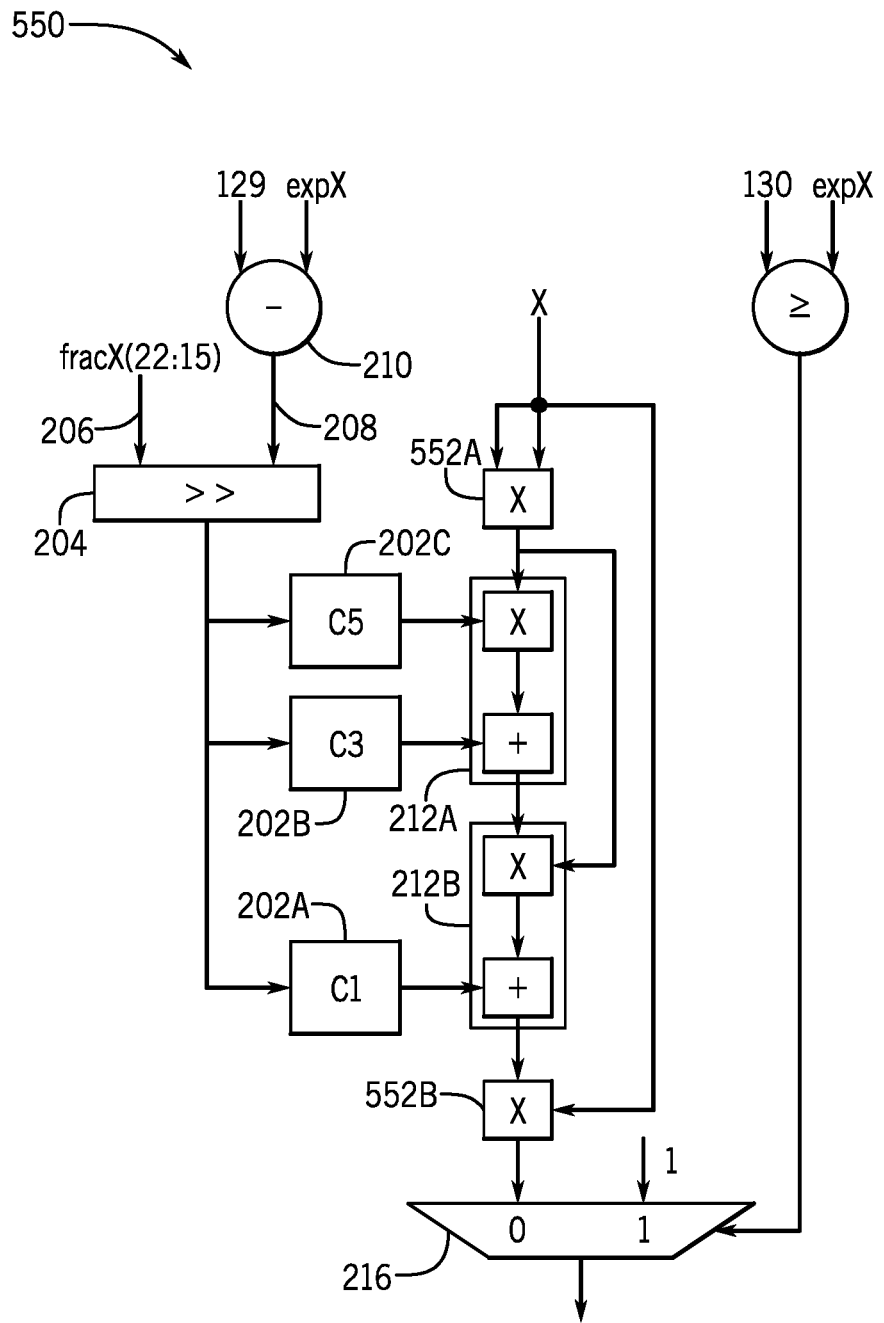
FIG. 12 is a block diagram illustrating a hyperbolic tangent approximation circuit, which may approximate the hyperbolic tangent function of FIG. 11, in accordance with an embodiment.

Turning now to FIG. 12, a hyperbolic tangent approximation circuit 550 may be used to calculate the hyperbolic tangent function according to the approximations described above. As such, the hyperbolic tangent approximation circuit 550 may compute an approximation of the hyperbolic tangent in the third positive interval 510 and in the third positive saturation interval 506 and may then select the approximation of the hyperbolic tangent function corresponding to an input value, x.

In order to compute an approximation of the hyperbolic tangent function in the third positive interval 510, the hyperbolic tangent approximation circuit 550 may implement the odd, fifth degree piecewise polynomial function, as described above.

Accordingly, the hyperbolic tangent approximation circuit 550 may include coefficient tables 202A-C that may store a suitable set of coefficients (e.g., C1, C3, C5, respectively) for each polynomial function in the odd, fifth degree piecewise polynomial function. The coefficient tables 202A-C may be indexed according to the sub-interval 152 (e.g., the polynomial function) each set of coefficients is mapped to. In some embodiments, for example, the coefficient tables 202A-C may contain a fixed-point index (e.g., address) mapping each set of coefficients to a respective input (e.g., value of x) representative of a sub-interval 152. For example, the coefficient tables 202A-C may contain an 8-bit fixed-point address (e.g., 256 unique combinations) indexing each set of coefficients to 256 different sub-intervals 152.

A barrel shifter 204 may generate the fixed-point input that may map uniquely to a sub-interval 152. To do so, because, as shown in the illustrated embodiment, the input x is represented in single-precision floating point, the barrel shifter 204 may convert x to a fixed-point representation. As such, in the case of 256 sub-intervals 152, for example, the barrel shifter 204 may receive the most significant eight bits of the mantissa of x (e.g., fracX(22:15)) concatenated with an implicit bit (1) (e.g., 1&fracX(22:15)) as a first input 206 and may receive a shift value as a second input 208. A subtractor 210 may output the shift value as a result of the operation 129−expX, or the exponent of x (expX) subtracted from 130 (e.g., a bias value (127)+3). The barrel shifter 204 may then right shift the first input 206 by the shift value received as the second input 208 to generate the 8-bit fixed-point input to the coefficients table 202. In such embodiments, the 8-bit fixed point input may contain three integer bits and five fraction bits. Accordingly, shifting the first input 206 according to 129−expX may align the first input 206 to the correct decimal position in the 8-bit fixed-point format. That is, the value 127 may account for the bias inherently built into the exponent of x and the value of 2 may account for the decimal position of the 8-bit fixed-point so that an exponent value of 129, for example, may not result in any shifting of the first input 206, as the first input is already aligned with the 8-bit fixed-point format.

Along with the coefficient tables 202A-C, the hyperbolic tangent approximation circuit 550 may generate a result of a polynomial function in the odd, fifth degree piecewise polynomial function using a first multiply block 552A, a first multiply-add block 212A, a second multiply-add block 212B, and a second multiply block 552B. The first multiply block 552A, the first multiply-add block 212A, the second multiply-add block 212B, and the second multiply block 552B may respectively map to (e.g., fit within) a different single precision hard floating DSP block.

In some embodiments, the first multiply block 552A may multiply the input x by itself to generate $x^2$. The first multiply-add block may then multiply a suitable C5 coefficient from the coefficient table 202C by the $x^2$ term and may add the result (e.g., $C5*x^2$) with a suitable C3 coefficient received from the coefficient tables 202B. As such, the first multiply-add block 212A may output $C5*x^2+C3$ to the second multiply-add block 212B. The second multiply-add block 212B may then multiply the output of the first multiply-add block 212A ($C5*x^2+C3$) by the $x^2$ term generated by the first multiply block 552A and may add a result of this multiplication (e.g., $x^2*(C5*x^2+C3)$) with a suitable C1 coefficient received from the first coefficient table 202A. As such, the second multiply-add block 212B may output $C1+x^2*(C5*x^2+C3)$. The second multiply block 552B may receive the output ($C1+x^2*(C5*x^2+C3)$) from the second multiply-add block 212B and may multiply it by the input x to generate the output $x*(C1+x^2*(C5*x^2+C3))$, which may represent the value of the polynomial function in the odd, fifth degree polynomial function used to approximate the hyperbolic tangent function in the sub-interval 152 containing the input x.

The hyperbolic tangent approximation circuit 550 may further include a mux 216 configured to receive the approximations of the hyperbolic tangent function in the third positive interval 510 (e.g., the output of the second multiply block 552B) and the third positive saturation interval 506 (e.g., 1) and may select between the approximations based on an interval the input value of x resides in. As such, the mux 216 may receive a select signal to select a suitable approximation of an output of the hyperbolic tangent function for a value of x. In some embodiments, the select signal may include information related to the exponent of x (expX). In such embodiments, the select signal may indicate whether the input x is in the third positive saturation interval 506 or the third positive interval 510. For example, in embodiments with a positive input cut-off 106 of 8 and a negative input cut-off 110 value of −8, the select signal may include a value indicating whether 130 is greater than or equal to the biased value of expX is (e.g., 130>=expX) or a value indicating whether 3 is greater than or equal to the unbiased value of expX, which may indicate whether the value of x is greater than or equal to 8 (e.g., $2^3$=8). As such, a select signal value of 1 may represent a value of x that is in the third positive saturation interval 506, and a select signal value of 0 may represent a value of x that is in the third positive interval 510. Accordingly, based on the exponent of x, the hyperbolic tangent approximation circuit 550 may output, via the mux 216, a suitable positive approximation of the hyperbolic tangent function for the input x.

As the hyperbolic tangent approximation circuit 550 may output positive approximations of the hyperbolic tangent function, which may correspond to values of x in the third positive interval 510 or the third positive saturation interval 506, the hyperbolic tangent approximation circuit 550 may further include logic and/or circuitry to determine whether x is in the third negative interval 512 or the third negative saturation interval 508. When the input x is in the third negative interval 512 or the third negative saturation interval 508, the hyperbolic tangent approximation circuit 550 may generate a suitable approximation of the hyperbolic tangent function by taking the negative of the output of the mux 216, according to the third identity.

Figure 13:
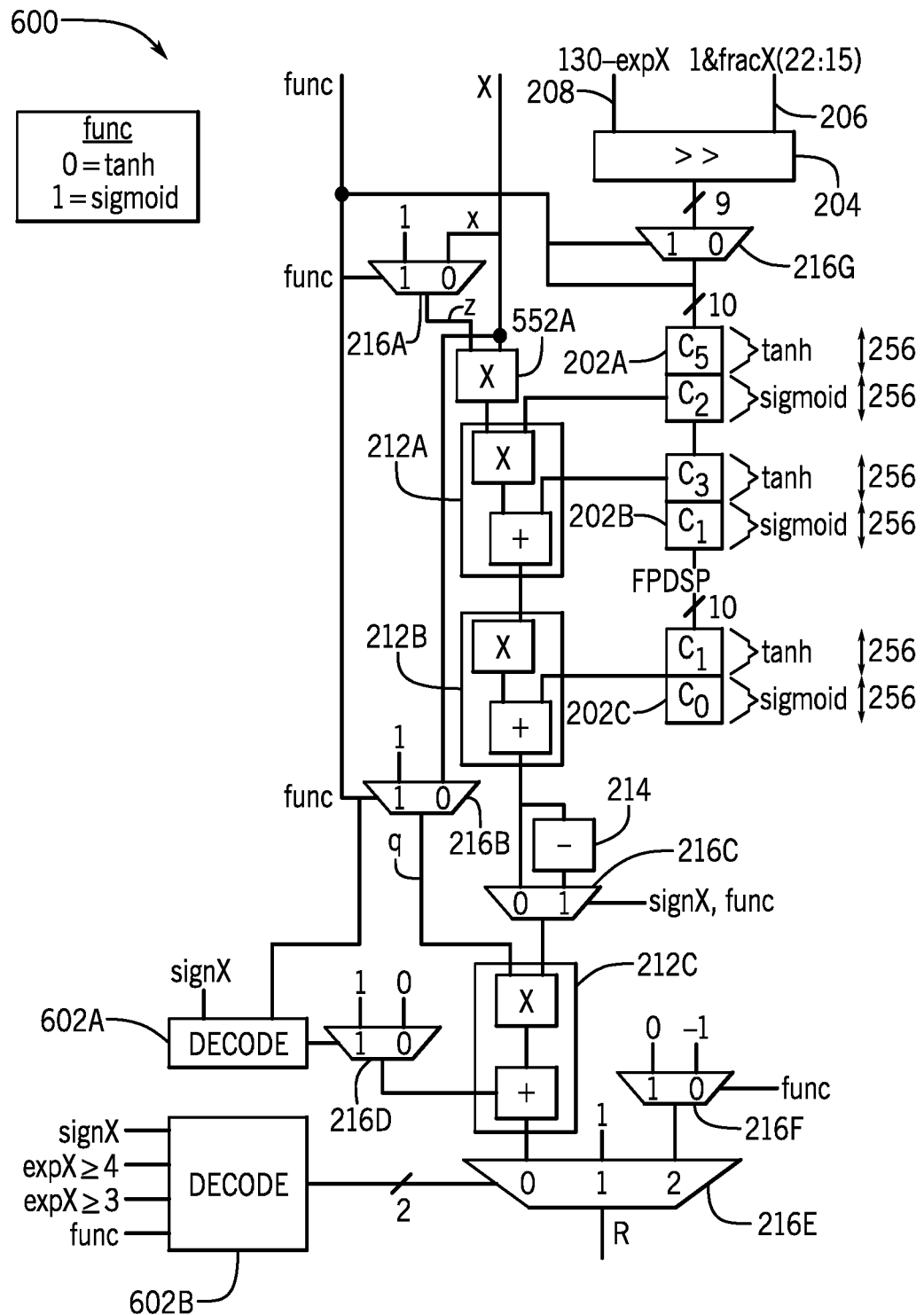
FIG. 13 is a block diagram illustrating a fused activation function approximation circuit which may approximate the sigmoid function of FIG. 3 and the hyperbolic tangent function of FIG. 11, in accordance with an embodiment.

While the hyperbolic tangent approximation circuit 550 and the sigmoid approximation circuit 200 may be implemented separately from one another, in some embodiments, a fused activation function approximation circuit 600, as illustrated in FIG. 13, may combine them into a single architecture. As the components (e.g, multiply-add blocks 212A-212B, mux 216, coefficient tables 202, barrel shifter 204, and/or the like) and general data flow through the hyperbolic tangent approximation circuit 550 and the sigmoid approximation circuit 200 may overlap (e.g., match), the fused activation function approximation circuit 600 may reduce redundant resources involved with implementing the hyperbolic tangent approximation circuit 550 and the sigmoid approximation circuit 200 separately.

Both the hyperbolic tangent approximation circuit 550 and the sigmoid approximation circuit 200 include a multiply-add blocks 212A-212B structured as a chained pair used to evaluate a polynomial. In the case of the sigmoid function, the polynomial evaluated may be represented as ($C0+x*(C1+C2*x)$), and in the case of the hyperbolic tangent, the polynomial evaluated is represented as ($x*(C1+x^2*(C3+C5*x^2))$). Using variable substitution $x^2$=y, the polynomial evaluated for hyperbolic tangent may be rewritten as (x*(C1+y*(C3+C5*y))), and with this expression, the right-hand side of the product (e.g., (C1+y*(C3+C5*y))) matches the structure of the polynomial evaluated for the sigmoid function. Accordingly, the fused activation function approximation circuit 600 may implement a fused datapath according to the function:

$$F(q,z)=q(c_L+z(c_M+z^*c_R))$$

where the function F(q, z) represents the sigmoid function or the hyperbolic tangent function. If the function F(q, z) is hyperbolic tangent, $q=x$, $z=x^2$, $c_L=c_{1\,Tan\,h}$, $c_M=c_{3\,Tan\,h}$, and $c_R=c_{5\,Tan\,h}$, where $c_{1\,Tan\,h}$, $c_{3\,Tan\,h}$, and $c_{5\,Tan\,h}$ are the coefficients of the hyperbolic tangent polynomial, and if the function F(q, z) is sigmoid, $q=1$, $z=x$, $c_L=c_{0Sigmoid}$, $c_M=c_{1Sigmoid}$, and $c_R=c_{2Sigmoid}$, where $c_{0Sigmoid}$, $c_{1Sigmoid}$, and $c_{2Sigmoid}$ are the coefficients of the sigmoid polynomial.

As such, in some embodiments, the fused activation function approximation circuit 600 may include a first mux 216A configured to output a suitable value to generate z. The first mux 216A may receive 1 and the input x as inputs and may select between these inputs based on a function select signal. For example, in the illustrated embodiment, a select signal of 0 corresponds to the hyperbolic tangent function and a select signal of 1 corresponds to the sigmoid function. Accordingly, a select signal of 0 (e.g., hyperbolic tangent) may select x as the output of the first mux 216A, and a select signal of 1 (e.g., sigmoid) may select 1 as the output of the first mux 216A. As discussed above, when the function F(q, z) is hyperbolic tangent, $z=x^2$ and when the function F(q, z) is sigmoid, $z=x$. Accordingly, a first multiply block 552A may receive the output of the first mux 216A and may multiply output by the input x to generate x or $x^2$ (e.g., z) based on the function implemented.

The output of the first multiply block 552A (e.g., z) may then feed into a first multiply-add block 212A, along with a set of coefficients (e.g., $c_R$ and $c_M$). In some embodiments, as $c_R$ may represent $c_{5\,Tan\,h}$ or $c_{2Sigmoid}$, a first coefficient table 202A may store coefficients mapped to each sub-interval 152 of both the hyperbolic tangent and the sigmoid function. For example, to approximate the hyperbolic tangent function with 256 sub-intervals and to approximate the sigmoid function with 256 sub-intervals 152, the first coefficient table 202A may contain 256 values for $c_{5\,Tan\,h}$ to map one $c_{5\,Tan\,h}$ value to each hyperbolic tangent sub-interval 152 and may contain 256 $c_{2Sigmoid}$ values to map one $c_{2Sigmoid}$ value to each sigmoid sub-interval. As such, the first coefficient table 202A may include 512 total entries. To that end, in the case of 256 coefficients for each function, to index the coefficients, the barrel shifter 204 may output an 8-bit index (e.g., 256 possible combinations) to select a suitable input based on the sub-interval of the input x. As such, similar to the discussions of the barrel shifter 204 operation in examples described above, the barrel shifter may receive a number of most significant bits concatenated with an implicit bit (1) (e.g., 1&fracX(22:15)) at a first input 206 and may receive a shift value (e.g., 130–expX) at a second input 208. The barrel shifter 204 may then suitably shift the value received at the first input 206 to align it with a fixed point format (e.g., 9-bit fixed point format). An additional mux 216G may then select, based on the function select signal, the bottom 8 bits (of the 9 fixed-point bits) if the function select signal corresponds to hyperbolic tangent (0) and may select the top 8 bits (of the 9 fixed-point bits) if the function select signal corresponds to sigmoid (1). Further, as the first coefficient table 202A may contain coefficients for both the sigmoid and hyperbolic tangent functions (e.g., 512 total entries), the fused activation function approximation circuit 600 may concatenate the function select signal with the index output by the mux 216G to index a first half of the coefficient table 202A, which may contain coefficients corresponding to the hyperbolic tangent function, or a second half of the coefficient table 202A, which may contain coefficients corresponding to the sigmoid function, based on the approximated function. The index output by the additional mux 216G concatenated with the function select signal may similarly index a second coefficient table 202B, which may include values of $c_M$ (e.g., $c_{3\,Tan\,h}$ and $c_{1Sigmoid}$).

In other embodiments, the fused activation function approximation circuit 600 may contain separate coefficient tables 202 some or all of the coefficients. In such embodiments, for example, the first coefficient table 202A may exclusively contain the $c_{5\,Tan\,h}$ coefficients and an additional coefficient table (not illustrated) may contain the $c_{2Sigmoid}$ coefficients. As such, the index output by the additional mux 216G may directly index the first coefficient table 202A and the additional coefficient table without the function select signal concatenated to it. Further, the fused activation function approximation circuit 600 may include an additional mux 216 (not illustrated) to select between a coefficient output by the first coefficient table 202A and a coefficient output by the additional coefficient table based on the function select signal as a select signal.

In any case, the first multiply-add block 212A may output ($c_M+z^*c_R$) to the second multiply-add block 212B. The second multiply-add block 212B may further receive a coefficient (e.g., $c_L$) from a third coefficient table 202C, which, as described above with reference to the first coefficient table 202A and the second coefficient table 202B, may include values for $c_{1\,Tan\,h}$ and/or $c_{0Sigmoid}$. As such, the second multiply-add block 212B may output $c_L+z(c_M+z^*c_R)$.

A third multiply-add block 212C may receive 1 or x (e.g., q) from a second mux 216B as an input. The second mux 216B may output the value of 1 or x (e.g., q) based on the function select signal (e.g., func) received as a select signal. As such, a select signal indicative of the hyperbolic tangent function may cause the second mux 216B to output x, and a select signal indicative of the sigmoid function may cause the second mux 216B to output 1. Further, depending on the sign of the input x (signX) and the function select signal (func), the third multiply-add block 212C may additionally receive the output of the second multiply-add block 212B (e.g., $c_L+z(c_M+z^*c_R)$) or the negative of the output of the second multiply-add block 212B (e.g., $-(c_L+z(c_M+z^*c_R))$) from a third multiplexer 216C. In some embodiments, for example, the third mux 216C may receive a select signal based on the exclusive or (XOR) of signX and func or a select signal decoded such that if the function is tan h and the sign of x (signX) is negative or if the function is sigmoid and signX is positive, the third mux 216C may output $-(c_L+z(c_M+z^*c_R))$, and if the function is tan h and signX is positive or if the function is sigmoid and signX is negative, the third mux 216C may output $c_L+z(c_M+z^*c_R)$. As such, the multiply operation in the third multiply-add block 212C may generate F(q, z) or –F(q, z) as an input to the add operation in the third multiply-add block 212C. The add operation may further receive a 1 or a 0 from a fourth mux 216D as an input based on the function select signal (e.g., func) and a sign of the input x. In the illustrated embodiment, for example, the fourth mux 216D may receive a select signal from a first decode block 602A (e.g., LUT). The first decode block may receive func and signX as inputs and may generate a suitable select signal for the fourth mux 216D. In some embodiments, as the first decode block 602A may select 0 as the fourth mux 216D output for function select signals indicating hyperbolic tangent, regardless of the value of signX, and for a combination of the function select signal indicating sigmoid and a signX value of 1 (e.g., negative x). Further, the first decode block 602A may select 1 for the fourth mux 216D output for a combination of the function select signal indicating sigmoid and the signX value of 0 (e.g., positive x). Accordingly, the third multiply-add block 212C may output an approximation of hyperbolic tangent in a negative interval (e.g., third negative interval 512) or in a positive interval (e.g., third positive interval 510) or may output an approximation of sigmoid in a negative interval (e.g., negative interval 114) or in a positive interval (e.g, positive interval 116). More specifically, the third multiply-add block 212C, may, for example, output $0+F(q, z)$ as an approximation of hyperbolic tangent in a positive interval or as an approximation of sigmoid in a negative interval, may output $0+-F(q, z)$ as an approximation of hyperbolic tangent in a negative interval, and may output $1-F(q, z)$ as an approximation of sigmoid in a positive interval.

Further, the fused activation function approximation circuit 600 may include a fifth mux 216E that may receive the output of the third multiply-add block 212C as an input, along with 1, which may represent an approximation of the hyperbolic tangent and sigmoid in a positive saturation interval, and an output from a sixth mux 216F, which may represent an approximation of hyperbolic tangent or sigmoid in a negative saturation region. The sixth mux 216F may, for example, output a 0 based on a function select signal indicating sigmoid is approximated and may output a −1 based on a function select signal indicating hyperbolic tangent is approximated. In any case, the fifth mux 216E may select a suitable approximation for the hyperbolic tangent or sigmoid function based on a select signal received from a second decode block 602B. In some embodiments, the second decode block 602B may receive the sign of x (signX), a signal indicating whether the exponent of x is greater than or equal to 4 (expX>=4), a signal indicating whether the exponent of x is greater than or equal to 3 (expX>=3), and func. That is, the second decode block 602B may determine the function approximated and the interval the input x lies in for the given function. As such, the fifth mux 216E may receive a first select signal (e.g., 0) for an approximation of hyperbolic tangent in the positive interval or the negative interval (e.g., expX<3) or an approximation of sigmoid in the positive or negative interval (e.g., expX<4), may receive a second select signal (e.g., 1) for an approximation of either hyperbolic tangent or sigmoid in the positive saturation interval, and may receive a third select signal (e.g., 2) for an approximation of hyperbolic tangent or sigmoid in the negative saturation region and may output a suitable result based on the received select signal. Accordingly, for any value of an input x, the fused activation function approximation circuit 600 may generate and select a suitable approximation of hyperbolic tangent or sigmoid resulting from the input x.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

Embodiments of the Current Application

The following numbered clauses define embodiments of the current application.

Clause A1. An integrated circuit device configured to receive an input and configured to approximate an activation function based at least in part on the input, comprising:
  a coefficient table comprising a plurality of coefficients, wherein the plurality of coefficients of the coefficient table are indexed to an index that is based at least in part on the input, wherein the coefficient table is configured to output a coefficient corresponding to the index, wherein the coefficient represents a coefficient in a polynomial approximating the activation function over a number of sub-intervals in a first interval; and
  multiply-add circuitry configured to evaluate the polynomial using a mathematical operation using the input and the coefficient to generate a first approximation result.

Clause A2. The integrated circuit device of clause A1, comprising:
  a multiplexer configured to receive:
    a first saturation value, wherein the first saturation value comprises a first asymptote value of the activation function;
    a second saturation value, wherein the second saturation value comprises an additional asymptote value of the activation function; and
    the first approximation result;
  wherein the multiplexer is configured to select, based at least in part on the input, an approximate output of the activation function among at least the first saturation value, the second saturation value, and the first approximation result.

Clause A3. The integrated circuit any of clauses A1, or 2, wherein the input comprises a floating point number having a first precision, and, wherein a barrel shifter is configured to receive the input and configured to generate the index, wherein the index is a fixed-point number having a second precision, wherein the second precision is less than or equal to the first precision.

Clause A4. The integrated circuit of any of clauses A1, 2, or 3, wherein the activation function comprises sigmoid.

Clause A5. The integrated circuit of clause A4, comprising:
  a subtractor configured to generate a second approximation result based at least in part on the first approximation result, wherein the second approximation result corresponds to an approximation of the activation function in a second interval, wherein the second interval comprises a second number of sub-intervals; and
  a multiplexer configured to receive the second approximation result and configured to select, based at least in part on the input, an approximate output of the activation function among at least the first approximation result and the second approximation result.

Clause A6. The integrated circuit of any of clauses A1, 2, 3, or 4, wherein the multiply-add circuitry is configured to use the mathematical operation, the mathematical operation having a first precision, the input having a second precision, the first approximation result having the second precision, wherein the first precision is greater than or equal to the second precision.

Clause A7. The integrated circuit of any of clauses A1, 2, 3, 4, or 6, wherein the activation function comprises hyperbolic tangent.

Clause A8. The integrated circuit of any of clauses A1, 2, 3, 4, 6, or 7, wherein the coefficient table is configured to store the coefficient, the coefficient having a lower precision than a precision of the multiply-add circuitry, and, wherein the integrated circuit comprises conversion circuitry configured to convert the coefficient from the lower precision to the precision.

Clause A9. The integrated circuit of any of clauses A1, 2, 3, 4, 6, 7, or 8, comprising:
- a second coefficient table comprising a second plurality of coefficients, wherein the second plurality of coefficients of the second coefficient table are indexed to the index, wherein the second coefficient table is configured to output a second coefficient corresponding to the index, wherein the second coefficient represents a second coefficient in a second polynomial approximating the activation function over a second number of sub-intervals in a second interval; and
- second multiply-add circuitry configured to evaluate the second polynomial using the mathematical operation using the input and the second coefficient to generate a second approximation result; and
- a multiplexer configured to receive the second approximation result and configured to select, based at least in part on the input, an approximate output of the activation function among at least the first approximation result and the second approximation result.

Clause A10. The integrated circuit of any of clauses A1, 2, 3, 4, 6, 7, 8, or 9, wherein the integrated circuit is configured to implement a recurrent neural network based at least in part on the first approximation result.

Clause A11. A tangible, non-transitory, machine-readable medium, comprising machine-readable instructions that, when executed by one or more processors, cause the processors to:
- receive an input to an activation function;
- evaluate a piecewise polynomial function to generate a first approximation result corresponding to a first input, wherein a first interval of inputs to the activation function comprises the first input, wherein the piecewise polynomial function approximates the activation function on the first interval;
- determine, using an identity of the activation function and the first approximation result, a second approximation result corresponding to a second input, wherein a second interval of inputs to the activation function comprises the second input;
- determine a first saturation value of the activation function corresponding to a third input, wherein a third interval of inputs to the activation function comprises the third input;
- determine a second saturation value of the activation function corresponding to a fourth input, wherein a fourth interval of inputs to the activation function comprises the fourth input;
- determine whether the first interval, the second interval, the third interval, or the fourth interval comprise the input; and
- in response to determining the first interval comprises the input, selecting the first approximation result as an approximate value of the activation function at the input.

Clause A12. The tangible, non-transitory, machine-readable medium of clause A11, comprising machine-readable instructions that, when executed by one or more processors, cause the processors to divide the first interval into a number of sub-intervals, wherein the piecewise polynomial function comprises a polynomial function for each sub-interval.

Clause A13. The tangible, non-transitory, machine-readable medium of clause A12, wherein an accuracy of the approximate value compared to a corresponding actual value of the activation function is based at least in part on the number of sub-intervals, a degree of the piecewise polynomial function, or a combination thereof.

Clause A14. The tangible, non-transitory, machine-readable medium of any of clauses A11 or 12, comprising machine-readable instructions that, when executed by one or more processors, cause the processors to:
- in response to determining the second interval comprises the input, selecting the second approximation result as the approximate value;
- in response to determining the third interval comprises the input, selecting the first saturation value as the approximate value; and
- in response to determining the fourth interval comprises the input, selecting the second saturation value as the approximate value.

Clause A15. The tangible, non-transitory, machine-readable medium of any of clauses A11, 12, or 14, wherein an accuracy of the approximate value compared to a corresponding actual value of the activation function is based at least in part on a size of the first interval.

Clause A16. A fused activation function approximation circuit configured to receive an input and configured to approximate an activation function based at least in part on the input, wherein the activation function selectively comprises a first activation function or a second activation function, comprising:
- a first input configured to receive a function select signal, wherein the function select signal indicates whether the activation function comprises the first activation function or the second activation function;
- a barrel shifter configured to receive the input and configured to generate a fixed-point index based at least in part on the input;
- a coefficient table comprising a plurality of coefficients, wherein the plurality of coefficients of the coefficient table are indexed to the fixed-point index, wherein the coefficient table is configured to output a coefficient corresponding to the fixed-point index, wherein the coefficient represents a coefficient in a polynomial approximation of the activation function, wherein the polynomial approximation selectively comprises a first polynomial function corresponding to the first activation function or a second polynomial function corresponding to the second activation function based at least in part on the function select signal;
- multiply-add circuitry configured to evaluate the polynomial approximation using a mathematical operation using the input and the coefficient to generate a first approximation result; and
- a multiplexer configured to receive:
  - a first saturation value, wherein the first saturation value comprises a first asymptote value of the activation function;
  - a second saturation value, wherein the second saturation value comprises a second asymptote value of the activation function and is generated based at least in part on the function select signal; and the first approximation result;

wherein, the multiplexer is configured to select, based at least in part on the input, an approximate output of the activation function among at least the first saturation value, the second saturation value, and the first approximation result.

Clause A17. The fused activation function approximation circuit of clause A16, the first polynomial function having a first degree, wherein the multiply-add circuitry is configured to evaluate the second polynomial function, the second polynomial function having a second degree, based at least in part on a multiplication of a polynomial having the first degree with a power of the input.

Clause A18. The fused activation function approximation circuit of any of clauses A16 or 17, wherein the first activation function comprises sigmoid and the second activation function comprises hyperbolic tangent.

Clause A19. The fused activation function approximation circuit of any of clauses A16, 17, or 18, wherein the plurality of coefficients comprises a first sub-set of coefficients corresponding to the first polynomial function and a second sub-set of coefficients corresponding to the second polynomial function.

Clause A20. The fused activation function approximation circuit of any clauses A16, 17, 18, or 19, comprising:

a second coefficient table comprising a second plurality of coefficients, wherein the second plurality of coefficients of the coefficient table are indexed to the fixed-point index, wherein the second coefficient table is configured to output a second coefficient corresponding to the fixed-point index, wherein the second coefficient represents a coefficient in the second polynomial function;

and an additional multiplexer configured to select, based at least in part on the function select signal, among at least the second coefficient and the coefficient to generate an additional input to the multiply-add circuitry, wherein the coefficient represents a coefficient in the first polynomial function, wherein the multiply-add circuitry is configured to evaluate the polynomial approximation using a mathematical operation using the input and the additional input to generate the first approximation result.

Clause A21. The fused activation function approximation circuit of any clauses A16, 17, 18, 19, or 20, wherein the first polynomial function comprises an odd polynomial function.

Clause B1. An integrated circuit device configured to receive an input and configured to approximate an activation function based at least in part on the input, comprising:

a coefficient table comprising a plurality of coefficients, wherein the plurality of coefficients of the coefficient table are indexed to an index that is based at least in part on the input, wherein the coefficient table is configured to output a coefficient corresponding to the index, wherein the coefficient represents a coefficient in a polynomial approximating the activation function over a number of sub-intervals in a first interval; and multiply-add circuitry configured to evaluate the polynomial using a mathematical operation using the input and the coefficient to generate a first approximation result.

Clause B2. The integrated circuit device of clause B1, comprising:

a multiplexer configured to receive:

a first saturation value, wherein the first saturation value comprises a first asymptote value of the activation function;

a second saturation value, wherein the second saturation value comprises an additional asymptote value of the activation function; and the first approximation result;

wherein the multiplexer is configured to select, based at least in part on the input, an approximate output of the activation function among at least the first saturation value, the second saturation value, and the first approximation result.

Clause B3. The integrated circuit any of clauses B1 or 2, wherein the input comprises a floating point number having a first precision, and, wherein a barrel shifter is configured to receive the input and configured to generate the index, wherein the index is a fixed-point number having a second precision, wherein the second precision is less than or equal to the first precision.

Clause B4. The integrated circuit of any of clauses B1, 2, or 3, wherein the activation function comprises sigmoid.

Clause B5. The integrated circuit of clause B4, comprising:

a subtractor configured to generate a second approximation result based at least in part on the first approximation result, wherein the second approximation result corresponds to an approximation of the activation function in a second interval, wherein the second interval comprises a second number of sub-intervals; and a multiplexer configured to receive the second approximation result and configured to select, based at least in part on the input, an approximate output of the activation function among at least the first approximation result and the second approximation result.

Clause B6. The integrated circuit of any of clauses B1, 2, 3, or 4, wherein the multiply-add circuitry is configured to use the mathematical operation, the mathematical operation having a first precision, the input having a second precision, the first approximation result having the second precision, wherein the first precision is greater than or equal to the second precision.

Clause B7. The integrated circuit of any of clauses B1, 2, 3, 4, or 6, wherein the activation function comprises hyperbolic tangent.

Clause B8. The integrated circuit of any of clauses B1, 2, 3, 4, 6, or 7, wherein the coefficient table is configured to store the coefficient, the coefficient having a lower precision than a precision of the multiply-add circuitry, and, wherein the integrated circuit comprises conversion circuitry configured to convert the coefficient from the lower precision to the precision.

Clause B9. The integrated circuit of any of clauses B1, 2, 3, 4, 6, 7, or 8, comprising:

a second coefficient table comprising a second plurality of coefficients, wherein the second plurality of coefficients of the second coefficient table are indexed to the index, wherein the second coefficient table is configured to output a second coefficient corresponding to the index, wherein the second coefficient represents a second coefficient in a second polynomial approximating the activation function over a second number of sub-intervals in a second interval;

and second multiply-add circuitry configured to evaluate the second polynomial using the mathematical operation using the input and the second coefficient to generate a second approximation result; and a multiplexer configured to receive the second approximation result and configured to select, based at least in part on the input, an approximate output of the activation function among at least the first approximation result and the second approximation result.

Clause B10. The integrated circuit of any of clauses B1, 2, 3, 4, 6, 7, 8, or 9, wherein the integrated circuit is configured to implement a recurrent neural network based at least in part on the first approximation result.

Clause B11. A hardware implemented method to approximate an activation function, comprising:
receiving an input to the activation function;
evaluating a piecewise polynomial function to generate a first approximation result corresponding to a first input, wherein a first interval of inputs to the activation function comprises the first input, wherein the piecewise polynomial function approximates the activation function on the first interval;
determining, using an identity of the activation function and the first approximation result, a second approximation result corresponding to a second input, wherein a second interval of inputs to the activation function comprises the second input;
determining a first saturation value of the activation function corresponding to a third input, wherein a third interval of inputs to the activation function comprises the third input;
determining a second saturation value of the activation function corresponding to a fourth input, wherein a fourth interval of inputs to the activation function comprises the fourth input;
determining whether the first interval, the second interval, the third interval, or the fourth interval comprise the input; and
in response to determining the first interval comprises the input, selecting the first approximation result as an approximate value of the activation function at the input.

Clause B12. The hardware implemented method of clause B11, comprising dividing the first interval into a number of sub-intervals, wherein the piecewise polynomial function comprises a polynomial function for each sub-interval.

Clause B13. The hardware implemented method of clause B12, wherein an accuracy of the approximate value compared to a corresponding actual value of the activation function is based at least in part on the number of sub-intervals, a degree of the piecewise polynomial function, or a combination thereof.

Clause B14. The hardware implemented method of clauses B11 or 12, comprising:
in response to determining the second interval comprises the input, selecting the second approximation result as the approximate value;
in response to determining the third interval comprises the input, selecting the first saturation value as the approximate value; and
in response to determining the fourth interval comprises the input, selecting the second saturation value as the approximate value.

Clause B15. The hardware implemented method of any of clauses B11, 12, or 14, wherein an accuracy of the approximate value compared to a corresponding actual value of the activation function is based at least in part on a size of the first interval.

Clause B16. A tangible, non-transitory, machine-readable medium, comprising machine-readable instructions that, when executed by one or more processors, cause the processors to perform the hardware implemented method of any of clauses B11, 12, 14, or 15.

Clause B17. A fused activation function approximation circuit configured to receive an input and configured to approximate an activation function based at least in part on the input, wherein the activation function selectively comprises a first activation function or a second activation function, comprising:
a first input configured to receive a function select signal, wherein the function select signal indicates whether the activation function comprises the first activation function or the second activation function;
a barrel shifter configured to receive the input and configured to generate a fixed-point index based at least in part on the input;
a coefficient table comprising a plurality of coefficients, wherein the plurality of coefficients of the coefficient table are indexed to the fixed-point index, wherein the coefficient table is configured to output a coefficient corresponding to the fixed-point index, wherein the coefficient represents a coefficient in a polynomial approximation of the activation function, wherein the polynomial approximation selectively comprises a first polynomial function corresponding to the first activation function or a second polynomial function corresponding to the second activation function based at least in part on the function select signal;
multiply-add circuitry configured to evaluate the polynomial approximation using a mathematical operation using the input and the coefficient to generate a first approximation result; and
a multiplexer configured to receive:
a first saturation value, wherein the first saturation value comprises a first asymptote value of the activation function;
a second saturation value, wherein the second saturation value comprises a second asymptote value of the activation function and is generated based at least in part on the function select signal; and
the first approximation result;
wherein, the multiplexer is configured to select, based at least in part on the input, an approximate output of the activation function among at least the first saturation value, the second saturation value, and the first approximation result.

Clause B18. The fused activation function approximation circuit of clause B17, the first polynomial function having a first degree, wherein the multiply-add circuitry is configured to evaluate the second polynomial function, the second polynomial function having a second degree, based at least in part on a multiplication of a polynomial having the first degree with a power of the input.

Clause B19. The fused activation function approximation circuit of any clauses B17 or 18, wherein the first activation function comprises sigmoid and the second activation function comprises hyperbolic tangent.

Clause B20. The fused activation function approximation circuit of any of clauses B17, 18, or 19, wherein the plurality of coefficients comprises a first sub-set of coefficients corresponding to the first polynomial function and a second sub-set of coefficients corresponding to the second polynomial function.

Clause B21. The fused activation function approximation circuit of any clauses B17, 18, 19, or 20, comprising:
a second coefficient table comprising a second plurality of coefficients, wherein the second plurality of coefficients of the coefficient table are indexed to the fixed-point index, wherein the second coefficient table is configured to output a second coefficient corresponding to the fixed-point index, wherein the second coefficient represents a coefficient in the second polynomial function; and an additional multiplexer configured to select, based at least in part on the function select signal, among at least the second coefficient and the coefficient to generate an additional input to the multiply-add circuitry, wherein the coefficient represents a coefficient in the first polynomial function, wherein the multiply-add circuitry is configured to evaluate the polynomial approximation using a mathematical operation using the input and the additional input to generate the first approximation result.

Clause B22. The fused activation function approximation circuit of any of clauses B17, 18, 19, 20, or 21, wherein the first polynomial function comprises an odd polynomial function.

Clause C1. An integrated circuit device configured to receive an input and configured to approximate an activation function based at least in part on the input, comprising:
a coefficient table comprising a plurality of coefficients, wherein the plurality of coefficients of the coefficient table are indexed to an index that is based at least in part on the input, wherein the coefficient table is configured to output a coefficient corresponding to the index, wherein the coefficient represents a coefficient in a polynomial approximating the activation function over a number of sub-intervals in a first interval; and
multiply-add circuitry configured to evaluate the polynomial using a mathematical operation using the input and the coefficient to generate a first approximation result.

Clause C2. The integrated circuit device of clause C1, comprising:
a multiplexer configured to receive:
a first saturation value, wherein the first saturation value comprises a first asymptote value of the activation function;
a second saturation value, wherein the second saturation value comprises an additional asymptote value of the activation function; and
the first approximation result;
wherein the multiplexer is configured to select, based at least in part on the input, an approximate output of the activation function among at least the first saturation value, the second saturation value, and the first approximation result.

Clause C3. The integrated circuit of any of clauses C1, or 2, wherein the activation function comprises sigmoid, hyperbolic tangent, or a combination thereof.

Clause C4. The integrated circuit of any of clauses C1, 2, or 3, comprising:
a subtractor configured to generate a second approximation result based at least in part on the first approximation result, wherein the second approximation result corresponds to an approximation of the activation function in a second interval, wherein the second interval comprises a second number of sub-intervals; and
a multiplexer configured to receive the second approximation result and configured to select, based at least in part on the input, an approximate output of the activation function among at least the first approximation result and the second approximation result.

Clause C5. The integrated circuit of any of clauses C1, 2, 3, or 4, wherein the multiply-add circuitry is configured to use the mathematical operation, the mathematical operation having a first precision, the input having a second precision, the first approximation result having the second precision, wherein the first precision is greater than or equal to the second precision.

Clause C6. The integrated circuit of any of clauses C1, 2, 3, 4, or 5, wherein the coefficient table is configured to store the coefficient, the coefficient having a lower precision than a precision of the multiply-add circuitry, and, wherein the integrated circuit comprises conversion circuitry configured to convert the coefficient from the lower precision to the precision.

Clause C7. The integrated circuit of any of clauses C1, 2, 3, 4, 5, or 6, comprising:
a second coefficient table comprising a second plurality of coefficients, wherein the second plurality of coefficients of the second coefficient table are indexed to the index, wherein the second coefficient table is configured to output a second coefficient corresponding to the index, wherein the second coefficient represents a second coefficient in a second polynomial approximating the activation function over a second number of sub-intervals in a second interval; and
second multiply-add circuitry configured to evaluate the second polynomial using the mathematical operation using the input and the second coefficient to generate a second approximation result; and
a multiplexer configured to receive the second approximation result and configured to select, based at least in part on the input, an approximate output of the activation function among at least the first approximation result and the second approximation result.

Clause C8. A tangible, non-transitory, machine-readable medium, comprising machine-readable instructions that, when executed by one or more processors, cause the processors to:
receive an input to an activation function;
evaluate a piecewise polynomial function to generate a first approximation result corresponding to a first input, wherein a first interval of inputs to the activation function comprises the first input, wherein the piecewise polynomial function approximates the activation function on the first interval;
determine, using an identity of the activation function and the first approximation result, a second approximation result corresponding to a second input, wherein a second interval of inputs to the activation function comprises the second input;
determine a first saturation value of the activation function corresponding to a third input, wherein a third interval of inputs to the activation function comprises the third input;
determine a second saturation value of the activation function corresponding to a fourth input, wherein a fourth interval of inputs to the activation function comprises the fourth input;
determine whether the first interval, the second interval, the third interval, or the fourth interval comprise the input; and
in response to determining the first interval comprises the input, selecting the first approximation result as an approximate value of the activation function at the input.

Clause C9. The tangible, non-transitory, machine-readable medium of clause C8, comprising machine-readable instructions that, when executed by one or more processors, cause the processors to divide the first interval into a number of sub-intervals, wherein the piecewise polynomial function comprises a polynomial function for each sub-interval.

Clause C10. The tangible, non-transitory, machine-readable medium of any of clauses C8 or 9, comprising machine-readable instructions that, when executed by one or more processors, cause the processors to:
in response to determining the second interval comprises the input, selecting the second approximation result as the approximate value;
in response to determining the third interval comprises the input, selecting the first saturation value as the approximate value; and
in response to determining the fourth interval comprises the input, selecting the second saturation value as the approximate value.

Clause C11. A fused activation function approximation circuit configured to receive an input and configured to approximate an activation function based at least in part on the input, wherein the activation function selectively comprises a first activation function or a second activation function, comprising:
a first input configured to receive a function select signal, wherein the function select signal indicates whether the activation function comprises the first activation function or the second activation function;
a barrel shifter configured to receive the input and configured to generate a fixed-point index based at least in part on the input;
a coefficient table comprising a plurality of coefficients, wherein the plurality of coefficients of the coefficient table are indexed to the fixed-point index, wherein the coefficient table is configured to output a coefficient corresponding to the fixed-point index, wherein the coefficient represents a coefficient in a polynomial approximation of the activation function, wherein the polynomial approximation selectively comprises a first polynomial function corresponding to the first activation function or a second polynomial function corresponding to the second activation function based at least in part on the function select signal;
multiply-add circuitry configured to evaluate the polynomial approximation using a mathematical operation using the input and the coefficient to generate a first approximation result; and
a multiplexer configured to receive:
a first saturation value, wherein the first saturation value comprises a first asymptote value of the activation function;
a second saturation value, wherein the second saturation value comprises a second asymptote value of the activation function and is generated based at least in part on the function select signal; and
the first approximation result;
wherein, the multiplexer is configured to select, based at least in part on the input, an approximate output of the activation function among at least the first saturation value, the second saturation value, and the first approximation result.

Clause C12. The fused activation function approximation circuit of clause C11, the first polynomial function having a first degree, wherein the multiply-add circuitry is configured to evaluate the second polynomial function, the second polynomial function having a second degree, based at least in part on a multiplication of a polynomial having the first degree with a power of the input.

Clause C13. The fused activation function approximation circuit of any of clause C11 or 12, wherein the first activation function comprises sigmoid and the second activation function comprises hyperbolic tangent.

Clause C14. The fused activation function approximation circuit of any of clause C11 12, or 13, wherein the plurality of coefficients comprises a first sub-set of coefficients corresponding to the first polynomial function and a second sub-set of coefficients corresponding to the second polynomial function.

Clause C15. The fused activation function approximation circuit of any of clause C11 12, 13, or 14, comprising:
a second coefficient table comprising a second plurality of coefficients, wherein the second plurality of coefficients of the coefficient table are indexed to the fixed-point index, wherein the second coefficient table is configured to output a second coefficient corresponding to the fixed-point index, wherein the second coefficient represents a coefficient in the second polynomial function;
and an additional multiplexer configured to select, based at least in part on the function select signal, among at least the second coefficient and the coefficient to generate an additional input to the multiply-add circuitry, wherein the coefficient represents a coefficient in the first polynomial function, wherein the multiply-add circuitry is configured to evaluate the polynomial approximation using a mathematical operation using the input and the additional input to generate the first approximation result.

What is claimed is:

1. An integrated circuit device configured to receive an input and configured to approximate an activation function based at least in part on the input, comprising:
a coefficient table comprising a plurality of coefficients, wherein the plurality of coefficients of the coefficient table are indexed to an index that is based at least in part on the input, wherein the coefficient table is configured to output a coefficient corresponding to the index, wherein the coefficient represents a coefficient in a polynomial approximating the activation function over a number of sub-intervals in a first interval;
multiply-add circuitry configured to evaluate the polynomial using a mathematical operation using the input and the coefficient to generate a first approximation result; and
a subtractor configured to generate a second approximation result based on an identity of the activation function and the first approximation result, wherein the second approximation result corresponds to an approximation of the activation function in a second interval, wherein the second interval comprises a second number of sub-intervals.

2. The integrated circuit device of claim 1, comprising:
a multiplexer configured to receive:
a first saturation value, wherein the first saturation value comprises a first asymptote value of the activation function;
a second saturation value, wherein the second saturation value comprises an additional asymptote value of the activation function; and
the first approximation result;
wherein the multiplexer is configured to select, based at least in part on the input, an approximate output of the activation function among at least the first saturation value, the second saturation value, and the first approximation result.

3. The integrated circuit device of claim 1, wherein the input comprises a floating point number having a first precision, and, wherein a barrel shifter is configured to receive the input and configured to generate the index, wherein the index is a fixed-point number having a second precision, wherein the second precision is less than or equal to the first precision.

4. The integrated circuit device of claim 1, wherein the activation function comprises sigmoid.

5. The integrated circuit device of claim 4, comprising:
a multiplexer configured to receive the second approximation result and configured to select, based at least in part on the input, an approximate output of the activation function among at least the first approximation result and the second approximation result.

6. The integrated circuit device of claim 1, wherein the multiply-add circuitry is configured to use the mathematical operation, the mathematical operation having a first precision, the input having a second precision, the first approximation result having the second precision, wherein the first precision is greater than or equal to the second precision.

7. The integrated circuit device of claim 1, wherein the activation function comprises hyperbolic tangent.

8. The integrated circuit device of claim 1, wherein the coefficient table is configured to store the coefficient, the coefficient having a lower precision than a precision of the multiply-add circuitry, and, wherein the integrated circuit device comprises conversion circuitry configured to convert the coefficient from the lower precision to the precision.

9. The integrated circuit device of claim 1, comprising:
a second coefficient table comprising a second plurality of coefficients, wherein the second plurality of coefficients of the second coefficient table are indexed to the index, wherein the second coefficient table is configured to output a second coefficient corresponding to the index, wherein the second coefficient represents a second coefficient in a second polynomial approximating the activation function over a second number of sub-intervals in a second interval;
and
second multiply-add circuitry configured to evaluate the second polynomial using the mathematical operation using the input and the second coefficient to generate a second approximation result; and
a multiplexer configured to receive the second approximation result and configured to select, based at least in part on the input, an approximate output of the activation function among at least the first approximation result and the second approximation result.

10. The integrated circuit device of claim 1, wherein the integrated circuit device is configured to implement a recurrent neural network based at least in part on the first approximation result.

11. A fused activation function approximation circuit configured to receive an input and configured to approximate an activation function based at least in part on the input, wherein the activation function selectively comprises a first activation function or a second activation function, comprising:
a first input configured to receive a function select signal, wherein the function select signal indicates whether the activation function comprises the first activation function or the second activation function;
a barrel shifter configured to receive the input and configured to generate a fixed-point index based at least in part on the input;
a coefficient table comprising a plurality of coefficients, wherein the plurality of coefficients of the coefficient table are indexed to the fixed-point index, wherein the coefficient table is configured to output a coefficient corresponding to the fixed-point index, wherein the coefficient represents a coefficient in a polynomial approximation of the activation function, wherein the polynomial approximation selectively comprises a first polynomial function corresponding to the first activation function or a second polynomial function corresponding to the second activation function based at least in part on the function select signal;
multiply-add circuitry configured to evaluate the polynomial approximation using a mathematical operation using the input and the coefficient to generate a first approximation result; and
a multiplexer configured to receive:
a first saturation value, wherein the first saturation value comprises a first asymptote value of the activation function;
a second saturation value, wherein the second saturation value comprises a second asymptote value of the activation function and is generated based at least in part on the function select signal;
the first approximation result; and
a second approximation result determined using an identity of the activation function and the first approximation result, wherein the second approximation result corresponds to an approximation of the activation function in a second interval, wherein the second interval comprises a second number of sub-intervals;
wherein the multiplexer is configured to select, based at least in part on the input, an approximate output of the activation function among at least the first saturation value, the second saturation value, the first approximation result, and the second approximation result.

12. The fused activation function approximation circuit of claim 11, the first polynomial function having a first degree, wherein the multiply-add circuitry is configured to evaluate the second polynomial function, the second polynomial function having a second degree, based at least in part on a multiplication of a polynomial having the first degree with a power of the input.

13. The fused activation function approximation circuit of claim 11, wherein the first activation function comprises sigmoid and the second activation function comprises hyperbolic tangent.

14. The fused activation function approximation circuit of claim 11, wherein the plurality of coefficients comprises a first sub-set of coefficients corresponding to the first polynomial function and a second sub-set of coefficients corresponding to the second polynomial function.

15. The fused activation function approximation circuit of claim 11, comprising:
a second coefficient table comprising a second plurality of coefficients, wherein the second plurality of coefficients of the coefficient table are indexed to the fixed-point index, wherein the second coefficient table is configured to output a second coefficient corresponding to the fixed-point index, wherein the second coefficient represents a coefficient in the second polynomial function;
and an additional multiplexer configured to select, based at least in part on the function select signal, among at least the second coefficient and the coefficient to generate an additional input to the multiply-add circuitry, wherein the coefficient represents a coefficient in the first polynomial function, wherein the multiply-add circuitry is configured to evaluate the polynomial approximation using a mathematical operation using the input and the additional input to generate the first approximation result.

* * * * *